United States Patent
Kamara et al.

(10) Patent No.: US 12,511,421 B2
(45) Date of Patent: Dec. 30, 2025

(54) SYSTEMS AND METHODS FOR END-TO END-ENCRYPTION WITH ENCRYPTED MULTI-MAPS

(71) Applicant: MongoDB, Inc., New York, NY (US)

(72) Inventors: Seny Kamara, New York, NY (US); Tarik Moataz, Brooklyn, NY (US); Mark Porter, Seattle, WA (US)

(73) Assignee: MongoDB, Inc., New York, NY (US)

( * ) Notice: Subject to any disclaimer, the term of this patent is extended or adjusted under 35 U.S.C. 154(b) by 226 days.

(21) Appl. No.: 18/328,867

(22) Filed: Jun. 5, 2023

(65) Prior Publication Data

US 2023/0325524 A1    Oct. 12, 2023

Related U.S. Application Data

(63) Continuation-in-part of application No. 17/570,730, filed on Jan. 7, 2022, now Pat. No. 12,039,073, which is a continuation-in-part of application No. 17/563,425, filed on Dec. 28, 2021, and a continuation-in-part of application No. 17/514,681, filed on Oct. 29, 2021, now abandoned, said application No. 17/563,425 is a continuation-in-part of application No. 17/514,681, filed on Oct. 29, 2021, now abandoned.

(60) Provisional application No. 63/349,208, filed on Jun. 6, 2022, provisional application No. 63/135,053, filed on Jan. 8, 2021, provisional application No.
(Continued)

(51) Int. Cl.
*G06F 21/62* (2013.01)
*G06F 16/21* (2019.01)

(52) U.S. Cl.
CPC ........ *G06F 21/6227* (2013.01); *G06F 16/213* (2019.01)

(58) Field of Classification Search
USPC ....................................................... 713/193
See application file for complete search history.

(56) References Cited

U.S. PATENT DOCUMENTS 11,269,824 B1    3/2022    Waas et al.
12,039,073 B2    7/2024    Moataz
(Continued)

OTHER PUBLICATIONS

Amjad et al., Dynamic Volume-Hiding Encrypted Multi-Maps with Applications to Searchable Encryption. Google. Jun. 10, 2021. 31 pages.
(Continued)

*Primary Examiner* — Brandon Hoffman
(74) *Attorney, Agent, or Firm* — Wolf, Greenfield & Sacks, P.C.

(57) ABSTRACT

According to some aspects, provided are systems and methods that implement end-to-end encryption, and provide implementation configured to secure information during execution of queries on an encrypted data source. Various embodiments include multiple encrypted multi-map data structures and associated encryption schemes configured to securely read, write, and delete information while supporting any one or more of the following features: snapshot security, multiple client support, efficient execution under concurrent operation, and resilience to client failures. In various embodiments, addressable multi-map data structures enable concurrent access, and allow correct operation under polynomial time constraints.

20 Claims, 28 Drawing Sheets

Related U.S. Application Data

63/132,063, filed on Dec. 30, 2020, provisional application No. 63/131,487, filed on Dec. 29, 2020.

(56) References Cited

U.S. PATENT DOCUMENTS

| | | | |
|---|---|---|---|
| 2015/0188949 | A1 | 7/2015 | Mahaffey |
| 2016/0314212 | A1 | 10/2016 | Menday |
| 2017/0235969 | A1* | 8/2017 | Kamara ............... G06F 16/284 713/159 |
| 2020/0285777 | A1 | 9/2020 | Heller et al. |
| 2022/0207171 | A1 | 6/2022 | Moataz |
| 2022/0215115 | A1 | 7/2022 | Moataz |
| 2022/0222184 | A1 | 7/2022 | Irwin |
| 2023/0055992 | A1 | 2/2023 | Vinayagamurthy |
| 2023/0067981 | A1* | 3/2023 | Varbedian ............... H04L 63/20 |
| 2023/0177177 | A1 | 6/2023 | George et al. |
| 2023/0315896 | A1 | 10/2023 | Kamara et al. |
| 2023/0315897 | A1 | 10/2023 | Karama et al. |
| 2024/0289485 | A1 | 8/2024 | Moataz |

OTHER PUBLICATIONS

Kamara et al., Computationally Volume-Hiding Structure Encryption. International Conference on the Theory and Application of Cryptographic Techniques. May 19, 2019. 30 pages.

Patel et al., Mitigating Leakage in Secure Cloud-Hosted Data Structures: Volume-Hiding for Multi-Maps via Hashing. ACM SIGSAC Conference. Nov. 2019. 26 pages.

Wang et al., Simple Storage-Saving Structure for Volume-Hiding Encrypted Multi-Maps (A Slot in Need is a Slot Indeed). International Federation for Information Processing. Jul. 2021. pp. 63-83.

Wang et al., Practical Volume-Hiding Encrypted Multi-Maps with Optimal Overhead and Beyond. Association for Computing Machinery. Nov. 7, 2022. 2825-2839.

Wong et al., Secure query processing with data interoperability in a cloud database environment. In Proceedings of the 2014 ACM SIGMOD international conference on Management of data. 1395-1406.

Amjad et al., Breach-Resistant Structured Encryption. Proceedings on Privacy Enhancing Technologies. Sep. 16, 2018(1):245-65. doi 10.2478/popets-2019-0014.

Boelter et al., A Secure One-Roundtrip Index for Range Queries. Technical Report 2016/568, IACR ePrint Cryptography Archive, 2016.

Boldyreva et al., Order-Preserving Symmetric Encryption. Order-preserving symmetric encryption. 2009. Advances in Cryptology EUROCRYPT. pp. 224-41.

Boneh et al., Semantically Secure Order-Revealing Encryption: Multi-Input Functional Encryption Without Obfuscation. EUROCRYPT. 2015. pp. 563-94.

Bost et al., Forward and Backward Private Searchable Encryption from Constrained Cryptographic Primitives, 2017.

Bost., Sophos—forward Secure Searchable Encryption*. 23rd ACM Conference on Computer and Communications Security. 2016. Doi:10.1145/2976749.2978303. 19 Pages.

Cash et al., Dynamic Searchable Encryption in Very-Large Databases: Data Structures and Implementation. Network and Distributed System Security Symposium. Feb. 23-26, 2014. ISBN: 1-891562-35-5. 16 Pages.

Chase et al., Structured encryption and controlled disclosure. Advances in Cryptology.2010.6477:577-94.

Demertzis et al. Practical Private Range Search Revisited. Proceedings of the 2016 International Conference on Management of Data. 2016. pp. 185-198. Doi.org/10.1145/2882903.2882911.

Faber et al. Rich Queries on Encrypted Data: Beyond Exact Matches*. European Symposium on research in computer security. 2015.pp. 123-145.

Goldreich et al., Software Protection and Simulation on Oblivious RAMs. Journal of the ACM.1996.43(3):431-473.

Grubbs et al. Learning to Reconstruct: Statistical Learning Theory and Encrypted Database Attacks. 2019 IEEE Symposium on Security and Privacy (SP), pp. 1067-1083.

Grubbs et al., Pump up the vol. Practical Database Reconstruction from Volume Leakage on Range Queries. Proceedings of the 2018 ACM SIGSAC Conference on Computer and Communications Security, pp. 315-331, 2018.

Ishai et al., Private Large-Scale Databases with Distributed Searchable Symmetric Encryption. Cryptographers' Track at the RSA Conference. 2016. pp. 90-107.

Kamara et al., An optimal relational database encryption scheme. IACR Cryptol. ePrint Arch., 2020:274.

Kamara et al., Cryptographic Cloud Storage. Workshop on Real-Life Cryptographic Protocols and Standardization. 2010. pp. 136-149.

Kamara et al., SQL on Structurally-Encrypted Databases. Technical Report 2016/453, IACR ePrint Cryptography Archive. 58 Pages.

Kellaris et al., Generic Attacks on Secure Outsourced Databases. In ACM Conference on Computer and Communications Security. 2016. 12 Pages.

Lacharite' et al., Improved Reconstruction Attacks on Encrypted Data Using Range Query Leakage. 2018. IEEE Symposium on Security and Privacy (SP), pp. 297-314.

Moataz et al., Oblivious substring search with updates. IACR Cryptol. ePrint Arch., 2015:722.

Naveed et al., Inference Attacks on Property-Preserving Encrypted Databases. ACM Conference on Computer and Communications Security (CCS), 2015. pp. 644-655.

Pappas et al., Blind Seer: A Scalable Private DBMS. Security and Privacy (SP), 2014 IEEE Symposium. pp. 359-374.

Song et al., Practical Techniques for Searches on Encrypted Data*. IEEE Symposium on Research in Security and Privacy. 2000. pp. 44-55.

Zhao et al., Encrypted databases: From theory to systems. Conference on Innovative Data Systems Research. 2021. 7 Pages.

* cited by examiner

Let $F : \{0,1\}^k \times \{0,1\}^* \to \{0,1\}^*$ be a pseudo-random function, $\mathsf{SKE} = (\mathsf{Gen}, \mathsf{Enc}, \mathsf{Dec})$ be a symmetric encryption scheme. Consider the response-revealing stateless addressable two-dimensional multi-map encryption scheme $\Sigma_M =$ (Init, WriteToken, Write, ReadToken, ReadXToken, ReadXYToken, Read, EraseToken, Erase, Resolve) defined as follows:

- $\mathsf{Init}(1^k)$:
    1. sample a key $K_t \xleftarrow{\$} \{0,1\}^k$ and compute $K_e \leftarrow \mathsf{SKE.Gen}(1^k)$;
    2. initialize an empty dictionary DX;
    3. output $K := (K_t, K_e)$ and $\mathsf{EMM} := \mathsf{DX}$;

- $\mathsf{WriteToken}(K, (\ell_x, \ell_y), \mathbf{v})$:
    1. parse $K$ as $(K_t, K_e)$;
    2. compute $K_\ell := F(F_{K_t}(\ell_x), \ell_y)$;
    3. for all $1 \leq i \leq \#\mathbf{v}$, compute $\mathsf{ct}_i \leftarrow \mathsf{SKE.Enc}(K_e, v_i)$;
    4. set $\mathbf{ct} := (\mathsf{ct}_1, \ldots, \mathsf{ct}_{\#\mathbf{v}})$;
    5. output $\mathsf{wtk} := (K_\ell, \mathbf{ct})$;

- $\mathsf{Write}(\mathsf{EMM}, \mathsf{wtk}, \mathbf{a})$:
    1. parse EMM as DX, wtk as $(K_\ell, \mathbf{ct})$;
    2. for all $1 \leq i \leq \#\mathbf{a}$, set $\mathsf{DX}[F_{K_\ell}(a_i)] := \mathsf{ct}_i$;
    3. output $\mathsf{EMM} := \mathsf{DX}$;

- $\mathsf{ReadToken}(K, (\ell_x, \ell_y))$:
    1. parse $K$ as $(K_t, K_e)$;
    2. compute $K_\ell := F(F_{K_t}(\ell_x), \ell_y)$;
    3. output $\mathsf{rtk} := K_\ell$;

- $\mathsf{ReadXToken}(K, \ell_x)$: parse $K$ as $(K_t, K_e)$ and output $\mathsf{rxtk} := F_{K_t}(\ell_x)$.

- $\mathsf{ReadXYToken}(\mathsf{rxtk}, \ell_y)$: output $\mathsf{rtk} := F_{\mathsf{rxtk}}(\ell_y)$.

- $\mathsf{Read}(\mathsf{EMM}, \mathsf{rtk}, \mathbf{a})$:
    1. parse EMM as DX and rtk as $K_\ell$;
    2. initialize an empty sequence $\mathbf{ct}$;
    3. for all $1 \leq i \leq \#\mathbf{a}$, compute $\mathsf{ct}_i := \mathsf{DX}[F_{K_\ell}(a_i)]$ and set $\mathbf{ct} := (\mathbf{ct}, \mathsf{ct}_i)$;
    4. output $\mathbf{ct}$;

- $\mathsf{EraseToken}(K, (\ell_x, \ell_y))$:
    1. parse $K$ as $(K_t, K_e)$;
    2. compute $K_\ell := F_{K_t}(\ell)$;
    3. output $\mathsf{etk} := K_\ell$;

- $\mathsf{Erase}(\mathsf{EMM}, \mathsf{etk}, a)$:
    1. parse EMM as DX and etk as $K_\ell$;
    2. set $\mathsf{DX}[F_{K_\ell}(a)] := \bot$;
    3. output $\mathsf{EMM} := \mathsf{DX}$;

- $\mathsf{Resolve}(K, \mathbf{ct})$:
    1. parse $K$ as $(K_1, K_2)$;
    2. initialize an empty sequence $\mathbf{v}$;
    3. for all $1 \leq i \leq \#\mathbf{ct}$, compute $v_i := \mathsf{Dec}_{K_2}(\mathsf{ct}_i)$ and set $\mathbf{v} := (\mathbf{v}, v_i)$;
    4. output $\mathbf{v}$.

Figure 1: $\Sigma_M$: a stateless addressable two-dimensional multi-map encryption scheme.

Let $F : \{0,1\}^k \times \{0,1\}^* \to \{0,1\}^*$ be a pseudo-random function, $\mathsf{SKE} = (\mathsf{Gen}, \mathsf{Enc}, \mathsf{Dec})$ be a symmetric encryption scheme. Consider the stateless response-revealing two-dimensional dictionary encryption scheme $\Sigma_C = (\mathsf{Init}, \mathsf{PutKey}, \mathsf{PutToken}, \mathsf{Put}, \mathsf{GetToken}, \mathsf{GetXToken}, \mathsf{GetXYToken}, \mathsf{Get}, \mathsf{DeleteToken}, \mathsf{Delete})$ defined as follows:

- $\mathsf{Init}(1^k)$:
    1. sample a key $K \xleftarrow{\$} \{0,1\}^k$;
    2. initialize a dictionary DX;
    3. output $K$ and $\mathsf{EDX} := \mathsf{DX}$;

- $\mathsf{PutKey}(K, (\ell_x, \ell_y))$:
    1. compute $K_x := F_K(\ell_x)$ and $K_\ell := F_{K_x}(\ell_y)$;
    2. output $\mathsf{pk} := K_\ell$;

- $\mathsf{PutToken}(\mathsf{pk}, v)$:
    1. parse pk as $K_\ell$;
    2. compute $K_t := F_{K_\ell}(1)$ and $K_e := F_{K_\ell}(2)$;
    3. compute $\mathsf{ct} \leftarrow \mathsf{SKE.Enc}_{K_e}(v)$;
    4. output $\mathsf{ptk} := (K_t, \mathsf{ct})$.

- $\mathsf{Put}(\mathsf{EDX}, \mathsf{ptk})$:
    1. parse EDX as DX and wtk as $(K_t, \mathsf{ct})$;
    2. compute $a := \mathsf{Binary}(K_t, \mathsf{DX})$ and set $\mathsf{DX}[F_{K_t}(a+1)] := \mathsf{ct}$;
    3. output $\mathsf{EDX} := \mathsf{DX}$;

- $\mathsf{GetToken}(K, (\ell_x, \ell_y))$: compute $K_x := F_K(\ell_x)$ and output $\mathsf{gtk} := F_{K_x}(\ell_y)$;

- $\mathsf{GetXToken}(K, \ell_x)$: output $\mathsf{gxtk} = F_K(\ell_x)$;

- $\mathsf{GetXYToken}(\mathsf{gxtk}, \ell_y)$:
    1. parse gxtk as $K_x$;
    2. output $\mathsf{gtk} := F_{K_x}(\ell_y)$;

- $\mathsf{Get}(\mathsf{EDX}, \mathsf{gtk})$:
    1. parse EDX as DX and gtk as $K_\ell$;
    2. compute $K_t := F_{K_\ell}(1)$ and $K_e := F_{K_\ell}(2)$;
    3. compute $a := \mathsf{Binary}(K_t, \mathsf{DX})$;
    4. if $a \neq 0$,
        (a) compute $\mathsf{ct} := \mathsf{DX}[F_{K_t}(a)]$;
        (b) set $v := \mathsf{SKE.Dec}(K_e, \mathsf{ct})$;
    5. else set $v := \perp$;
    6. output $v$;

- $\mathsf{DeleteToken}(K, (\ell_x, \ell_y))$: compute $K_x := F_K(\ell_x)$ and output $\mathsf{dtk} := F_{K_x}(\ell_y)$;

- $\mathsf{Delete}(\mathsf{EDX}, \mathsf{dtk})$:
    1. parse EDX as DX and dtk as $K_\ell$;
    2. compute $K_t := F_{K_\ell}(1)$;
    3. set $a := 1$;
    4. while $\mathsf{DX}[F_{K_t}(a)] \neq \perp$,
        (a) set $\mathsf{DX}[F_{K_t}(a)] := \perp$
        (b) set $a := a + 1$;
    5. output $\mathsf{EDX} := \mathsf{DX}$.

Figure 2: $\Sigma_C$: a stateless two-dimensional dictionary encryption scheme.

Let $F : \{0,1\}^k \times \{0,1\}^* \to \{0,1\}^*$ be a pseudo-random function, $\mathsf{SKE} = (\mathsf{Gen}, \mathsf{Enc}, \mathsf{Dec})$ be a symmetric encryption scheme. Consider the stateless response-revealing two-dimensional multi-map encryption scheme $\Sigma_D$ = (Init, AppendKey, AppendToken, Append, PutKey, PutToken, Put, GetToken, GetXToken, GetXYToken, Get, DeleteToken, Delete) defined as follows:

- Init$(1^k)$:
    1. sample a key $K \xleftarrow{\$} \{0,1\}^k$;
    2. initialize an empty dictionary DX;
    3. output $K$ and EMM := DX;

- AppendKey$(K, (\ell_x, \ell_y))$: compute $K_x := F_K(\ell_x)$ and output ak := $F_{K_x}(\ell_y)$;

- AppendToken(ak, $v$):
    1. parse ak as $K_\ell$;
    2. compute $K_t := F_{K_\ell}(1)$ and $K_e := F_{K_\ell}(2)$;
    3. compute ct $\leftarrow$ SKE.Enc$(K_e, v)$;
    4. output atk := $(K_t, \mathrm{ct})$;

- Append(EMM, atk):
    1. parse EMM as DX and atk as $(K_t, \mathrm{ct})$;
    2. compute $a \leftarrow$ Binary$(K_t, \mathrm{DX})$;
    3. set DX$[F_{K_t}(a+1)]$ := ct;
    4. output EMM := DX;

- PutKey$(K, (\ell_x, \ell_y))$:
    1. compute $K_x := F_K(\ell_x)$ and $K_\ell := F_{K_x}(\ell_y)$;
    2. output pk := $K_\ell$;

- PutToken(pk, v):
    1. parse pk as $K_\ell$;
    2. compute $K_t := F_{K_\ell}(1)$ and $K_e := F_{K_\ell}(2)$;
    3. for all $1 \le i \le m$, compute $\mathrm{ct}_i \leftarrow$ SKE.Enc$(K_e, v_i)$;
    4. set ct := $(\mathrm{ct}_1, \ldots, \mathrm{ct}_m)$;
    5. output ptk := $(K_t, \mathbf{ct})$;

- Put(EMM, ptk):
    1. parse EMM as DX and ptk as $(K_t, \mathbf{ct})$;
    2. for all $1 \le i \le m$, set DX$[F_{K_t}(i)]$ := $\mathrm{ct}_i$;
    3. output EMM := DX;

Figure 3: $\Sigma_D$: a stateless two-dimensional multi-map encryption scheme (part 1).

- GetToken$(K, (\ell_x, \ell_y))$: compute $K_x := F_K(\ell_x)$ and output gtk $:= F_{K_x}(\ell_y)$;
- GetXToken$(K, \ell_x)$: output gxtk $:= F_K(\ell_x)$;
- GetXYToken$(\text{gxtk}, \ell_y)$:
    1. parse gxtk as $K_x$;
    2. output gtk $:= F_{K_x}(\ell_y)$;
- Get(EMM, gtk):
    1. parse EMM as DX and gtk as $K_\ell$;
    2. compute $K_t := F_{K_\ell}(1)$ and $K_e := F_{K_\ell}(2)$;
    3. initialize an empty sequence v and set $i := 1$;
    4. while $DX[F_{K_t}(i)] \neq \bot$,
        (a) compute ct $:= DX[F_{K_t}(i)]$ and $v \leftarrow$ SKE.Dec$(K_e, \text{ct})$
        (b) set $\mathbf{v} := (\mathbf{v}, v)$ and $i = i + 1$;
    5. output v.
- DeleteToken$(K, (\ell_x, \ell_y))$: compute $K_x := F_K(\ell_x)$ and output dtk $= F_{K_x}(\ell_y)$;
- Delete(EMM, dtk):
    1. parse EMM as DX and dtk as $K_\ell$;
    2. compute $K_t = F_{K_\ell}(1)$ and set $i := 1$;
    3. while $DX[F_{K_t}(i)] \neq \bot$, set $DX[F_{K_t}(i)]) := \bot$ and $i := i + 1$;
    4. output EMM $=$ DX.

Figure 4: $\Sigma_D$: a stateless two-dimensional multi-map encryption scheme (part 2).

Let SKE $=$ (Gen, Enc, Dec) be a symmetric-key encryption scheme. Consider the stateless response-revealing set encryption scheme $\Sigma_P =$ (Init, InsertToken, Insert, Enum) defined as follows:

- Init$(1^k)$:
    1. sample a key $K \xleftarrow{\$} \{0, 1\}^k$;
    2. initialize an empty set SET;
    3. output $K$ and EST $=$ SET.
- InsertToken$(K, v)$:
    1. compute ct $=$ Enc$_K(v)$;
    2. output itk $=$ ct.
- Insert(EST, itk):
    1. parse EST as SET;
    2. add itk to SET;
    3. output EST' $=$ SET.
- Enum$(K, \text{EST})$:
    1. parse EST as SET$^{\text{old}}$;
    2. initialize an empty set SET and set EST as SET;
    3. initialize a set Result;
    4. for all ct $\in$ SET, add Dec$_K(\text{ct})$ to Result;
    5. output Result.

Figure 5: $\Sigma_P$: a stateless enumerable encrypted set scheme.

- BinSearch($K$, DX):
    1. let $\rho$ to the size estimate of DX;
    2. while $\text{DX}[F_K(\rho)] \neq \bot$, set $\rho := 2\rho$;
    3. set $i := 0$, median $:= 0$, min $:= 1$ and max $:= \rho$;
    4. for $i = 1$ to $\lceil \log(\rho) \rceil$,
        (a) set median $:= \lceil (\text{max} - \text{min})/2 \rceil + \text{min}$;
        (b) compute tag $:= F_K(\text{median})$;
        (c) if $\text{DX}[\text{tag}] \neq \bot$,
            i. set min $:= $ median;
            ii. if $i = \lceil \log(\rho) \rceil$, then set $i := $ min;
        (d) otherwise if $\text{DX}[\text{tag}] = \bot$,
            i. set max $:= $ median;
            ii. if $i = \lceil \log(\rho) \rceil$ and $\text{DX}[F_K(\text{min})] \neq \bot$, then set $i := $ min;
    5. output $i$.

Figure 6: A binary search subroutine.

- Merge($\mathbf{g}$):
    1. let $S_1 = \{(a_1, b_1), \ldots, (a_n, b_n)\}$ be the pairs in $\mathbf{g}$;
    2. let $S_2 = \{c_1, \ldots, c_m\}$ be the singleton elements in $\mathbf{g}$;
    3. for all $1 \leq i \leq \#S_2$, add $(c_i, c_i)$ to $S_1$;
    4. sort the pairs in $S_1$ in increasing order by the first value in the pair;
    5. set $i = 1$;
    6. while $i < \#S_1$,
        (a) if $b_i + 1 = a_{i+1}$;
            i. remove $(a_i, b_i)$ and $(a_{i+1}, b_{i+1})$ from $S_1$;
            ii. add $(a_i, b_{i+1})$ to $S_1$ in the same position as $(a_i, b_i)$;
        (b) else set $i = i + 1$;
    7. set $\mathbf{g} := S_1$;
    8. output $\mathbf{g}$.

Figure 7: A merge subroutine.

Let $\Sigma_M$ = (Init, WriteToken, Write, ReadToken, Read, EraseToken, Erase, Resolve), $\Sigma_C$ = (Init, PutToken, Put, GetToken, GetXToken, GetXYToken, Get, DeleteToken, Delete) and $\Sigma_D$ = (Init, AppendToken, Append, PutKey, PutToken, Put, GetToken, Get, DeleteToken, Delete) be the schemes described in Figures 2, 3 and 4, and 5, respectively. Let $\mathbb{L}_C$ denote the set of labels in in the multi-map with a high degree of contention and let $p \in \mathbb{N}$ be the maximum number of partitions. Consider the stateless response-hiding multi-map encryption scheme $\Omega_P$ = (Init, PutToken, Put, GetToken, Get, DeleteToken, Delete, CompactionToken, Compaction, Resolve) defined as follows:

- $\mathsf{Init}(1^k)$:
    1. compute $(K_M, \mathsf{EMM}_M) \leftarrow \Sigma_M.\mathsf{Init}(1^k)$;
    2. compute $(K_C, \mathsf{EDX}_C) \leftarrow \Sigma_C.\mathsf{Init}(1^k)$;
    3. compute $(K_D, \mathsf{EMM}_D) \leftarrow \Sigma_D.\mathsf{Init}(1^k)$;
    4. compute $(K_P, \mathsf{EST}_P) \leftarrow \Sigma_P.\mathsf{Init}(1^k)$;
    5. output $K := (K_M, K_C, K_D, K_P)$ and $\mathsf{EMM} = (\mathsf{EMM}_M, \mathsf{EDX}_C, \mathsf{EMM}_D, \mathsf{EST}_P)$;

- $\mathsf{PutToken}(K, \ell, \mathbf{v})$:
    1. parse $K$ as $(K_M, K_C, K_D)$;
    2. if $\ell \in \mathbb{L}_C$, sample $u \xleftarrow{\$} \{1, \cdots, p\}$, otherwise set $u := 0$;
    3. compute $\mathsf{wtk}_M \leftarrow \Sigma_M.\mathsf{WriteToken}(K_M, (\ell, u), \mathbf{v})$;
    4. compute $\mathsf{gtk}_C \leftarrow \Sigma_C.\mathsf{GetToken}(K_C, (\ell, u))$;
    5. compute $\mathsf{dtk}_C \leftarrow \Sigma_C.\mathsf{DeleteToken}(K_C, (\ell, u))$;
    6. compute $\mathsf{pk}_C \leftarrow \Sigma_C.\mathsf{PutKey}(K_C, (\ell, u))$;
    7. compute $\mathsf{gtk}_D \leftarrow \Sigma_D.\mathsf{GetToken}(K_D, (\ell, u))$;
    8. compute $\mathsf{dtk}_D \leftarrow \Sigma_D.\mathsf{DeleteToken}(K_D, (\ell, u))$;
    9. compute $\mathsf{itk}_P \leftarrow \Sigma_P.\mathsf{InsertToken}(K_P, \mathsf{gtk}_C \| \mathsf{dtk}_C \| \mathsf{pk}_C \| \mathsf{gtk}_D \| \mathsf{dtk}_D)$;
    10. output $\mathsf{ptk} := (\mathsf{wtk}_M, \mathsf{gtk}_C, \mathsf{pk}_C, \mathsf{itk}_P, \#\mathbf{v})$.

- $\mathsf{Put}(\mathsf{EMM}, \mathsf{ptk})$:
    1. parse EMM as $(\mathsf{EMM}_M, \mathsf{EDX}_C, \mathsf{EMM}_D, \mathsf{EST}_P)$;
    2. parse ptk as $(\mathsf{wtk}_M, \mathsf{gtk}_C, \mathsf{pk}_C, \mathsf{itk}_P, m)$;
    3. compute $c \leftarrow \Sigma_C.\mathsf{Get}(\mathsf{EDX}_C, \mathsf{gtk}_C)$;
    4. if $c \neq \bot$ set count $:= c + 1$ else set count $:= 1$;
    5. compute $\mathsf{ptk}_C \leftarrow \Sigma_C.\mathsf{PutToken}(\mathsf{pk}_C, \mathrm{count} + m)$;
    6. set $\mathsf{EDX}_C \leftarrow \Sigma_C.\mathsf{Put}(\mathsf{EDX}_C, \mathsf{ptk}_C)$;
    7. compute $\mathsf{EMM}_M \leftarrow \Sigma_M.\mathsf{Write}(\mathsf{EMM}_M, \mathsf{wtk}_M, \{\mathrm{count}, \ldots, \mathrm{count} + m - 1\})$;
    8. set $\mathsf{EST}_P \leftarrow \Sigma_P.\mathsf{Append}(\mathsf{EST}_P, \mathsf{itk}_P)$;
    9. output $\mathsf{EMM} := (\mathsf{EMM}_M, \mathsf{EDX}_C, \mathsf{EMM}_D, \mathsf{EST}_P)$.

- $\mathsf{GetToken}(K, \ell)$:
    1. parse $K$ as $(K_M, K_C, K_D)$;
    2. compute $\mathsf{rtk}_M \leftarrow \Sigma_M.\mathsf{ReadXToken}(K_M, \ell)$;
    3. compute $\mathsf{gxtk}_C \leftarrow \Sigma_C.\mathsf{GetXToken}(K_C, \ell)$;
    4. compute $\mathsf{gxtk}_D \leftarrow \Sigma_D.\mathsf{GetXToken}(K_D, \ell)$;
    5. if $\ell \in \mathbb{L}_C$, set cont $:=$ true else set cont $:=$ false;;
    6. output $\mathsf{gtk} = (\mathsf{rxtk}_M, \mathsf{gxtk}_C, \mathsf{gxtk}_D, \mathrm{cont})$;

Figure 8: $\Omega_P$: a stateless multi-map encryption scheme (part 1).

- Get(EMM, gtk):
    1. parse EMM as $(\text{EMM}_M, \text{EDX}_C, \text{EMM}_D, \text{EST}_P)$ and gtk as $(\text{rtk}_M, \text{gxtk}_C, \text{gxtk}_D, \text{cont})$;
    2. initialize an empty sequence ct;
    3. if cont = true set $U := \{1, \ldots, p\}$ else set $U := \{0\}$;
    4. for all $u \in U$,
        (a) compute $\text{gtk}_C \leftarrow \Sigma_C.\text{GetXYToken}(\text{gxtk}_C, u)$;
        (b) compute $\text{count}_u \leftarrow \Sigma_C.\text{Get}(\text{EDX}_C, \text{gtk}_C)$;
        (c) if $\text{count}_u \neq \bot$,
            i. compute $\text{gtk}_D \leftarrow \Sigma_D.\text{GetXYToken}(\text{gxtk}_D, u)$;
            ii. compute $\mathbf{g}_u \leftarrow \Sigma_D.\text{Get}(\text{EMM}_D, \text{gtk}_D)$;
            iii. compute $\text{rtk}_M \leftarrow \Sigma_M.\text{ReadXYToken}(\text{rxtk}_M, u)$;
            iv. compute $\mathbf{ct}_u \leftarrow \Sigma_M.\text{Read}(\text{EMM}_M, \text{rtk}_M, \{1, \ldots, \text{count}_u\} \setminus \mathbf{g}_u)$;
            v. set $\mathbf{ct} = (\mathbf{ct}, \mathbf{ct}_u)$;
    5. output ct;

- EraseToken($K, \ell, u, a$):
    1. parse $K$ as $(K_M, K_C, K_D)$;
    2. compute $\text{etk}_M \leftarrow \Sigma_M.\text{EraseToken}(K_M, (\ell, u))$;
    3. compute $\text{gtk}_D \leftarrow \Sigma_D.\text{GetToken}(K_D, (\ell, u))$;
    4. compute $\text{atk}_D \leftarrow \Sigma_D.\text{AppendToken}(K_D, (\ell, u), a)$;
    5. compute $\text{dtk}_D \leftarrow \Sigma_D.\text{DeleteToken}(K_D, (\ell, u))$;
    6. compute $\text{gtk}_C \leftarrow \Sigma_C.\text{GetToken}(K_C, (\ell, u))$;
    7. compute $\text{dtk}_C \leftarrow \Sigma_C.\text{DeleteToken}(K_C, (\ell, u))$;
    8. compute $\text{pk}_C \leftarrow \Sigma_C.\text{PutKey}(K_C, (\ell, u))$;
    9. compute $\text{itk}_P \leftarrow \Sigma_P.\text{InsertToken}(K_P, \text{gtk}_C \| \text{dtk}_C \| \text{pk}_C \| \text{gtk}_D \| \text{dtk}_D)$
    10. output $\text{etk} := (\text{etk}_M, \text{gtk}_D, \text{atk}_D, a, \text{itk}_P)$;

- Erase(EMM, etk):
    1. parse EMM as $(\text{EMM}_M, \text{EDX}_C, \text{EDX}_C, \text{EST}_P)$;
    2. parse etk as $(\text{etk}_M, \text{gtk}_D, \text{atk}_D, a, \text{itk}_P)$;
    3. compute $\text{EST}_P \leftarrow \Sigma_P.\text{Append}(\text{EST}_P, \text{itk}_P)$;
    4. compute $\text{EMM}_M \leftarrow \Sigma_M.\text{Erase}(\text{EMM}_M, \text{etk}_M, a)$;
    5. compute $\text{EMM}_D \leftarrow \Sigma_D.\text{Append}(\text{EMM}_D, \text{atk}_D)$;
    6. output $\text{EMM}_D$;

Figure 9: $\Omega_P$: a stateless multi-map encryption scheme (part 2).

- CompactionToken($K$):
    1. parse $K$ as $(K_M, K_C, K_D, K_P)$;
    2. output $\text{ctk} = K_P$;

- Compaction(EMM, ctk):
    1. parse EMM as $(\text{EMM}_M, \text{EDX}_C, \text{EMM}_D, \text{EST}_P)$;
    2. parse ctk as $K_P$;
    3. compute $P \leftarrow \Sigma_P.\text{Enum}(K_P, \text{EST}_P)$,
    4. for all $(\text{gtk}_C \| \text{dtk}_C \| \text{pk}_C \| \text{gtk}_D \| \text{dtk}_D) \in P$;
        (a) compute count $\leftarrow \Sigma_C.\text{Get}(\text{EDX}_C, \text{gtk}_C)$;
        (b) compute $\mathbf{g} \leftarrow \Sigma_D.\text{Get}(\text{EMM}_D, \text{gtk}_D)$;
        (c) compute $\mathbf{g}' \leftarrow \text{Merge}(\mathbf{g})$;
        (d) compute $\text{EDX}_C \leftarrow \Sigma_C.\text{Delete}(\text{EDX}_C, \text{dtk}_C)$;
        (e) if $\mathbf{g}' \neq \mathbf{g}$, compute $\text{EMM}_D \leftarrow \Sigma_D.\text{Delete}(\text{EMM}_D, \text{dtk}_D)$;
        (f) if $\mathbf{g}' \neq \{1, \ldots, \text{count}\}$
            i. compute $\text{ptk}_C \leftarrow \Sigma_C.\text{PutToken}(\text{pk}_C, \text{count})$;
            ii. compute $\text{EDX}_C \leftarrow \Sigma_C.\text{Put}(\text{EDX}_C, \text{ptk}_C)$;
            iii. compute $\text{ptk}_D \leftarrow \Sigma_D.\text{PutToken}(\text{pk}_D, \mathbf{g}')$;
            iv. if $\mathbf{g}' \neq \mathbf{g}$, compute $\text{EMM}_D \leftarrow \Sigma_D.\text{Put}(\text{EMM}_D, \text{ptk}_D)$;
    5. output EMM = $(\text{EMM}_M, \text{EDX}_C, \text{EMM}_D, \text{EST}_P)$;

- Resolve($K$, ct): parse $K$ as $(K_M, K_C, K_D, K_P)$ and output $\mathbf{v} \leftarrow \Sigma_M.\text{Resolve}(K_M, \text{ct})$.

Figure 10: $\Omega_P$: a stateless multi-map encryption scheme (part 3).

Let $\Omega_P = $ (Init, GetToken, Get, PutToken, Put, EraseToken, Erase, CompactionToken, Compaction, Resolve) be a stateless, response-hiding dynamic multi-map encryption scheme and $\Gamma_H = $ (Edges$_H$, Mincover$_H$) be a hypergraph scheme. Consider the stateless range multi-map encryption scheme $\Omega_R = $ (Init, PutToken, Put, RangeToken, Range, EraseToken, Erase, CompactionToken, Compaction, Resolve) defined as follows:

- Init$(1^k)$:
    1. compute $(K, \text{EMM}) \leftarrow \Omega_P.\text{Init}(1^k)$;
    2. output $K$ and ERMM := EMM.

- PutToken$(K, \ell, \mathbf{v})$:
    1. compute $\mathbf{E}_\ell := \Gamma.\text{Edges}_H(\ell)$;
    2. for all $e \in \mathbf{E}_\ell$, set $\text{ptk}_e \leftarrow \Omega_P.\text{PutToken}(K, e, \mathbf{v})$;
    3. output ptk $= (\text{ptk}_e)_{e \in \mathbf{E}_\ell}$.

- Put(ERMM, ptk):
    1. parse ERMM as EMM$_1$ and ptk as $(\text{ptk}_1, \ldots, \text{ptk}_n)$;
    2. for all $1 \leq i \leq n$, compute EMM$_{i+1} \leftarrow \Omega_P.\text{Put}(\text{EMM}_i, \text{ptk}_i)$;
    3. output EMM$_n$.

- RangeToken$(K, r)$:
    1. compute $\mathbf{C}_r := \text{Mincover}_H(r)$;
    2. for all $e \in \mathbf{C}_r$, compute $\text{gtk}_e \leftarrow \Omega_P.\text{GetToken}(K, e)$;
    3. output rtk $= (\text{gtk}_e)_{e \in \mathbf{C}_r}$.

- Range(ERMM, rtk):
    1. parse ERMM as EMM and rtk as $(\text{gtk}_1, \ldots, \text{gtk}_n)$;
    2. initialize an empty sequences ct;
    3. for all $1 \leq i \leq n$,
        (a) compute $\mathbf{ct}_i \leftarrow \Omega_P.\text{Get}(\text{EMM}, \text{gtk}_i)$;
        (b) set $\mathbf{ct} := (\mathbf{ct}, \mathbf{ct}_i)$;
    4. output ct;

- EraseToken$(K, \ell, c_1, \ldots, c_n)$:
    1. compute $(e_1, \cdots, e_n) := \Gamma.\text{Edges}_H(\ell)$;
    2. for all $1 \leq i \leq n$, set $\text{etk}_j \leftarrow \Omega_P.\text{EraseToken}(K, e_i, c_i)$;
    3. output etk $= (\text{etk}_1, \ldots, \text{etk}_n)$;

- Erase(ERMM, etk):
    1. parse ERMM as EMM$_1$ and etk as $(\text{etk}_1, \ldots, \text{etk}_n)$;
    2. for all $1 \leq i \leq n$, compute EMM$_{i+1} \leftarrow \Omega_P.\text{Delete}(\text{EMM}_i, \text{etk}_i)$;
    3. output EMM$_n$.

- CompactionToken$(K)$: output ctk $\leftarrow \Omega_P.\text{CompactionToken}(K)$.

- Compaction(EMM, ctk):
    1. parse ERMM as EMM;
    2. output EMM := $\Omega_P.\text{Compaction}(\text{EMM}, \text{ctk})$.

- Resolve$(K, \mathbf{ct})$: output $\mathbf{v} := \Omega_P.\text{Resolve}(K, \mathbf{ct})$.

Figure 11: $\Omega_R$: a stateless range multi-map encryption scheme.

Let $F : \{0,1\}^k \times \{0,1\}^* \rightarrow \{0,1\}^*$ be a pseudo-random function and $\mathsf{SKE} = (\mathsf{Gen}, \mathsf{Enc}, \mathsf{Dec})$ be a symmetric encryption scheme and consider the following `CreateCollection` operations:

- `db.createCollectionDriverKeys(`$1^k$`, schema, coll)`:
  1. compute db.createCollection("$\mathsf{edc}_{\mathsf{coll}}$");
  2. compute db.createCollection("$\mathsf{esc}_{\mathsf{coll}}$");
  3. compute db.createCollection("$\mathsf{ecc}_{\mathsf{coll}}$");
  4. compute db.createCollection("$\mathsf{ecoc}_{\mathsf{coll}}$").
  5. sample a root key $S \xleftarrow{\$} \{0,1\}^k$ and initialize a dictionary DEK;
  6. for all D $\in$ coll and all $f \in \mathbf{F}_\mathsf{D}$, set $\mathsf{DEK}[\mathit{did} \| f] \xleftarrow{\$} \{0,1\}^k$ where $\mathit{did}$ is the _id of D;
  7. output (DEK, S);

- `db.createCollectionCollectionKeys(`$K_{\mathsf{coll}}$`, coll)`:
  1. compute db.createCollection("$\mathsf{edc}_{\mathsf{coll}}$");
  2. compute db.createCollection("$\mathsf{esc}_{\mathsf{coll}}$");
  3. compute db.createCollection("$\mathsf{ecc}_{\mathsf{coll}}$");
  4. compute db.createCollection("$\mathsf{ecoc}_{\mathsf{coll}}$").
  5. sample a root key $S \xleftarrow{\$} \{0,1\}^k$ and initialize a dictionary DEK;
  6. for all D $\in$ coll and all $f \in \mathbf{F}_\mathsf{D}$, set $\mathsf{DEK}[\mathit{did} \| f] := K_{\mathsf{coll}}$ where $\mathit{did}$ is the _id of D;
  7. output (DEK, S);

- `db.createCollectionFieldKeys(`$(K_f)_{f \in \mathbf{F}}$`, coll)`:
  1. compute db.createCollection("$\mathsf{edc}_{\mathsf{coll}}$");
  2. compute db.createCollection("$\mathsf{esc}_{\mathsf{coll}}$");
  3. compute db.createCollection("$\mathsf{ecc}_{\mathsf{coll}}$");
  4. compute db.createCollection("$\mathsf{ecoc}_{\mathsf{coll}}$").
  5. sample a root key $S \xleftarrow{\$} \{0,1\}^k$ and initialize a dictionary DEK;
  6. for all D $\in$ coll and all $f \in \mathbf{F}_\mathsf{D}$, set $\mathsf{DEK}[\mathit{did} \| f] := K_f$ where $\mathit{did}$ is the _id of D;
  7. output (DEK, S);

- `db.createCollectionDocumentKeys(`$(K_\mathsf{D})_{\mathsf{D} \in \mathsf{coll}}$`, coll)`:
  1. compute db.createCollection("$\mathsf{edc}_{\mathsf{coll}}$");
  2. compute db.createCollection("$\mathsf{esc}_{\mathsf{coll}}$");
  3. compute db.createCollection("$\mathsf{ecc}_{\mathsf{coll}}$");
  4. compute db.createCollection("$\mathsf{ecoc}_{\mathsf{coll}}$").
  5. sample a root key $S \xleftarrow{\$} \{0,1\}^k$ and initialize a dictionary DEK;
  6. for all D $\in$ coll and all $f \in \mathbf{F}_\mathsf{D}$, set $\mathsf{DEK}[\mathit{did} \| f] := K_\mathsf{D}$ where $\mathit{did}$ is the _id of D;
  7. output (DEK, S);

- `db.createCollectionFieldDocumentKeys` $\left( \left( (K_{\mathsf{D},f})_{f \in \mathbf{F}_\mathsf{D}} \right)_{\mathsf{D} \in \mathsf{coll}}, \mathsf{coll} \right)$:
  1. compute db.createCollection("$\mathsf{edc}_{\mathsf{coll}}$");
  2. compute db.createCollection("$\mathsf{esc}_{\mathsf{coll}}$");
  3. compute db.createCollection("$\mathsf{ecc}_{\mathsf{coll}}$");
  4. compute db.createCollection("$\mathsf{ecoc}_{\mathsf{coll}}$").
  5. sample a root key $S \xleftarrow{\$} \{0,1\}^k$ and initialize a dictionary DEK;
  6. for all D $\in$ coll and all $f \in \mathbf{F}_\mathsf{D}$, set $\mathsf{DEK}[\mathit{did} \| f] := K_{\mathsf{D},f}$ where $\mathit{did}$ is the _id of D;
  7. output (DEK, S);

Figure 12: Emulated $\mathsf{OST}_1$: CreateCollection.

- db.collection.insert(DEK, S, D):
  - Client computes InsertToken(DEK, S, D):
    1. parse D as $\{\{\_id : did\}, \{f : v\}_{f \in \mathbf{EF_D}}, \{f : v\}_{f \in \mathbf{RF_D}}\}$;
    2. for all $f \in \mathbf{EF_D}$,
       (a) if $f \in \mathbf{HC}$, sample $u \xleftarrow{\$} \{1, \cdots, p\}$, otherwise set $u := 0$;
       (b) compute $S_f^{\mathsf{edc}} := F_S[f, 1, 1, v, u]$;
       (c) compute $S_f^{\mathsf{esc}} := F_S[f, 1, 2, v, u]$;
       (d) compute $S_f^{\mathsf{ecc}} := F_S[f, 1, 3, v, u]$;
       (e) compute $ct_f^{\mathsf{cp}} := \mathsf{SKE.Enc}(S_f^{\mathsf{ecoc}}, S_f^{\mathsf{esc}} \| S_f^{\mathsf{ecc}})$, where $S_f^{\mathsf{ecoc}} := F_S[f, 1, 4]$;
       (f) compute $ct_f := \mathsf{SKE.Enc}(K_f, v_f)$, where $K_f := \mathsf{DEK}[did\|f]$;
    3. for all $f \in \mathbf{RF_D}$,
       (a) let $\mathsf{ntype}_f$ be the precision, lower and upper bounds and sparsity of the domain of $f$;
       (b) compute $\mathbf{E}_f := \mathsf{Edges}_{\mathsf{SPH}}(v, \mathsf{ntype}_f)$;
       (c) if $f \in \mathbf{HC}$, sample $u \xleftarrow{\$} \{1, \cdots, p\}$, otherwise set $u := 0$;
       (d) for all $e \in \mathbf{E}_f$,
           i. compute $S_{f,e}^{\mathsf{edc}} := F_S[f, 1, 1, e, u]$;
           ii. compute $S_{f,e}^{\mathsf{esc}} := F_S[f, 1, 2, e, u]$;
           iii. compute $S_{f,e}^{\mathsf{ecc}} := F_S[f, 1, 3, e, u]$;
           iv. compute $ct_{f,e}^{\mathsf{cp}} := \mathsf{SKE.Enc}(S_f^{\mathsf{ecoc}}, S_{f,e}^{\mathsf{esc}} \| S_{f,e}^{\mathsf{ecc}})$, where $S_f^{\mathsf{ecoc}} := F_S[f, 1, 4]$;
       (e) compute $ct_f := \mathsf{SKE.Enc}(K_f, v)$, where $K_f := \mathsf{DEK}[did\|f]$;
    4. set $ED := \{\{\_id : did\}, \{f : ct_f\}_{f \in \mathbf{EF_D}}, \{f : ct_f\}_{f \in \mathbf{RF_D}}, \{\mathsf{safeContent} : []\}\}$;
    5. send ED and $$itk := \left(\left(S_f^{\mathsf{edc}}, S_f^{\mathsf{esc}}, S_f^{\mathsf{ecc}}, ct_f^{\mathsf{cp}}, S_{f,3}\right)_{f \in \mathbf{EF_D}}, \left(S_{f,e}^{\mathsf{edc}}, S_{f,e}^{\mathsf{esc}}, S_{f,e}^{\mathsf{ecc}}, ct_{f,e}^{\mathsf{cp}}, S_{f,3}\right)_{f \in \mathbf{RF_D}, e \in \mathbf{E}_f}\right),$$

where $S_{f,3} := F_S[f, 3]$, to the server.
  - Server computes Insert(ED, itk):
    1. initialize an empty array Tags;
    2. parse ED as $\{\{\_id : did\}, \{f : ct_f\}_{f \in \mathbf{EF_D}}, \{f : ct_f\}_{f \in \mathbf{RF_D}}, \{\mathsf{safeContent} : []\}\}$;
    3. parse itk as $$\left(\left(S_f^{\mathsf{edc}}, S_f^{\mathsf{esc}}, S_f^{\mathsf{ecc}}, ct_f^{\mathsf{cp}}, S_{f,3}\right)_{f \in \mathbf{EF}}, \left(S_{f,e}^{\mathsf{edc}}, S_{f,e}^{\mathsf{esc}}, S_{f,e}^{\mathsf{ecc}}, ct_{f,e}^{\mathsf{cp}}, S_{f,3}\right)_{e \in \mathbf{E}_f, f \in \mathbf{RF}}\right),$$

4. for all $f \in \mathbf{EF}$,
       (a) set $\mathbf{S} := \left\{\left(S_f^{\mathsf{esc}}, S_f^{\mathsf{ecc}}, S_f^{\mathsf{edc}}, ct_f^{\mathsf{cp}}\right)\right\}$;
       (b) compute $(ct'_f, \mathsf{tag}_f) := \mathsf{InsertFields}(\mathsf{esc}, \mathbf{S}, S_{f,3}, ct_f)$;
       (c) set $\mathsf{Tags} := \mathsf{Tags} \cup \mathsf{tag}_f$;
    5. for all $f \in \mathbf{RF}$,
       (a) set $\mathbf{S} := \left\{\left(S_{f,e}^{\mathsf{esc}}, S_{f,e}^{\mathsf{ecc}}, S_{f,e}^{\mathsf{edc}}, ct_{f,e}^{\mathsf{cp}}\right)_{e \in \mathbf{E}_f}\right\}$;
       (b) compute $(ct'_f, \mathsf{tag}_1, \ldots, \mathsf{tag}_m) := \mathsf{InsertFields}(\mathsf{esc}, \mathbf{S}, S_{f,3}, ct_f)$;
       (c) set $\mathsf{Tags} := \mathsf{Tags} \cup \{\mathsf{tag}_1, \ldots, \mathsf{tag}_m\}$;
    6. set $ED := \{\{\_id : did\}, \{f : ct'_f\}_{f \in \mathbf{EF_D}}, \{f : ct'_f\}_{f \in \mathbf{RF_D}}, \{\mathsf{safeContent} : \mathsf{Tags}\}\}$;
    7. compute db.edc.insert(ED).

Figure 13: Emulated $\mathsf{OST}_1$: Insert

- db.collection.find(DEK, S, {f : v}):
    - Client computes EqualToken(S, f, v):
        1. compute
            (a) $S_f^{edc} := F_S[f, 1, 1, v]$;
            (b) $S_f^{esc} := F_S[f, 1, 2, v]$;
            (c) $S_f^{ecc} := F_S[f, 1, 3, v]$;
        2. send eqtk := $(f, S_f^{edc}, S_f^{esc}, S_f^{ecc})$ to the server;
    - Server computes EqualFind(eqtk):
        1. parse eqtk as $(f, S_f^{edc}, S_f^{esc}, S_f^{ecc})$;
        2. initialize two sets $U$ and EncResult;
        3. if $f \in$ HC set $U := \{1, \cdots, p\}$, otherwise set $U := \{0\}$;
        4. for all $u \in U$,
            (a) compute $\text{count}_u := \text{GetCounter}(S_f^{esc}, u)$;
            (b) compute $g_u := \text{GetGaps}(S_f^{ecc}, u)$;
            (c) for all $i \in \{1, \cdots, \text{count}_u\} \setminus g_u$, compute
            $$R := \text{db.edc.find}\left(\left\{\texttt{safeContent} : F_{S_f^{edc}}[u, 1, i]\right\}\right);$$
            (d) set EncResult := EncResult $\cup$ R;
        5. send EncResult to client.
    - Client computes Resolve(DEK, S, EncResult):
        1. initialize an empty set Result;
        2. for all ED in EncResult,
            (a) parse ED as $\left\{\{\texttt{\_id} : \texttt{did}\}, \{\texttt{f} : \texttt{ct}_\texttt{f}\}_{\texttt{f} \in \textbf{F}_{\text{ED}}}, \{\texttt{safeContent} : [\texttt{tags}_1, \ldots, \texttt{tags}_\texttt{m}]\}\right\}$;
            (b) for all $f \in \textbf{F}_{\text{ED}}$,
                i. compute $K_f := \text{DEK}[did\|f]$ and $S_{f,3} := F_S[f, 3]$;
                ii. compute ct := SKE.Dec $(S_{f,3}, \text{ct}_f)$ and parse ct as $\text{ct}'_f \| x_1 \| \cdots \| x_n$;
                iii. compute $v_f := \text{SKE.Dec}\left(K_f, \text{ct}'_f\right)$;
            (c) set D := $\left\{\{\texttt{\_id} : \texttt{did}\}, \{\texttt{f} : \texttt{v}_\texttt{f}\}_{\texttt{f} \in \textbf{F}_{\text{ED}}}\right\}$;
            (d) set Result := Result $\cup$ D;
        3. output Result.

Figure 14: Emulated $OST_1$: Find with $eq operators.

- db.collection.find(DEK, S, {f : {$ne : v}}):
    - Client computes eqtk := EqualToken(S, f, v) and sends eqtk to Server;
    - Server computes NotEqualFind(eqtk):
        1. compute EncResult' := EqualFind(eqtk);
        2. initialize an empty set EncResult;
        3. compute R := db.edc.find ();
        4. set EncResult := R \ EncResult';
        5. send EncResult to client;
    - Client computes and outputs Result := Resolve(DEK, S, EncResult').

Figure 15: Emulated $OST_1$: Find with $ne operators.

- db.collection.find(DEK, S, {f : {\$gte : $v_1$, \$lte : $v_2$}}):
  - Client computes RangeToken(S, $f, v_1, v_2$):
    1. compute $\mathbf{C}_f := \mathsf{Mincover}_{\mathsf{SPH}}([v_1, v_2], \mathsf{ntype}_f)$;
    2. for all $e \in \mathbf{C}_f$,
       (a) compute $S^{\mathsf{edc}}_{f,e} := F_S[f, 1, 1, e]$;
       (b) compute $S^{\mathsf{esc}}_{f,e} := F_S[f, 1, 2, e]$;
       (c) compute $S^{\mathsf{ecc}}_{f,e} := F_S[f, 1, 3, e]$;
    3. send $f$ and $\mathsf{rtk} := \left( \left( S^{\mathsf{edc}}_{f,e}, S^{\mathsf{esc}}_{f,e}, S^{\mathsf{ecc}}_{f,e} \right)_{e \in \mathbf{C}_f} \right)$ to the server.
  - Server computes RangeFind($f, \mathsf{rtk}$):
    1. parse $\mathsf{rtk}$ as $\left( \left( S^{\mathsf{edc}}_{f,e}, S^{\mathsf{esc}}_{f,e}, S^{\mathsf{ecc}}_{f,e} \right)_{e \in \mathbf{C}_f} \right)$;
    2. initialize two sets $U$ and EncResult;
    3. if $f \in \mathbf{HC}$, set $U := \{1, \cdots, p\}$, otherwise set $U := \{0\}$;
    4. for all $e \in \mathbf{C}_f$ and all $u \in U$,
       (a) compute $\mathsf{count}_{e,u} := \mathsf{GetCounter}(S^{\mathsf{esc}}_{f,e}, u)$;
       (b) compute $\mathbf{g}_{e,u} := \mathsf{GetGaps}(S^{\mathsf{ecc}}_{f,e}, u)$;
       (c) for all $i \in \{1, \cdots, \mathsf{count}_{e,u}\} \setminus \mathbf{g}_{e,u}$, compute $$\mathbf{R} := \mathsf{db.edc.find}\left( \left\{ \mathsf{safeContent} : F_{S^{\mathsf{edc}}_{f,e}}[u, 1, i] \right\} \right)$$

(d) set EncResult := EncResult $\cup \mathbf{R}$;
    5. send EncResult to client.
  - Client computes and outputs Result := Resolve(DEK, S, EncResult).

Figure 16: Emulated $\mathsf{OST}_1$: Find with \$gte and \$lte operators.

- db.collection.find(DEK, S, {$and : [sel$_1$, $\cdots$, sel$_n$]}):

- Client computes MultiToken(S, sel$_1$, ..., sel$_n$):
    1. for all $1 \leq i \leq n$, compute $\overline{\text{sel}}_i$ := scrub(sel$_i$);
    2. let $(f_1, \cdots, f_n)$ be the fields in (sel$_1$, ..., sel$_n$);
    3. for all $1 \leq i \leq n$,
       (a) if sel$_i$ has form $\{\text{f}_i : \text{v}\}$ compute tk$_{f_i}$ := EqualToken(S, $f_i$, $v$);
       (b) if sel$_i$ has form $\{\$\text{not} : \{\text{f}_i : \text{v}\}\}$ compute tk$_{f_i}$ := EqualToken(S, $f_i$, $v$)
       (c) if sel$_i$ has form $\{\text{f}_i : \{\$\text{gte} : \text{v}_1, \$\text{lte} : \text{v}_2\}\}$ compute tk$_{f_i}$ := RangeToken(S, $f_i$, $v_1$, $v_2$);
       (d) if sel$_i$ has form $\{\$\text{not} : \{\text{f}_i : \{\$\text{gte} : \text{v}_1, \$\text{lte} : \text{v}_2\}\}\}$,
           i. compute tk$_{i,1}$ := RangeToken(S, $f_i$, lBound, $v_1 - 10^{-\text{precision}}$);
           ii. compute tk$_{i,2}$ := RangeToken(S, $f_i$, $v_2 + 10^{-\text{precision}}$, uBound);
           iii. set tk$_{f_i}$ := (tk$_{i,1}$, tk$_{i,2}$);
    4. send $\overline{\mathbf{Q}}$ := $\{\$\text{and} : [\overline{\text{sel}}_1, \ldots, \overline{\text{sel}}_n]\}$ and tk:=(S$_{f_1,3}$, ..., S$_{f_n,3}$, tk$_{f_1}$, ..., tk$_{f_n}$) to the server, where S$_{f_i,3}$ := $F_\text{S}[f_i, 3]$.

- Server computes AndFind($\overline{\mathbf{Q}}$, tk):
    1. parse $\overline{\mathbf{Q}}$ as $\{\$\text{and} : [\overline{\text{sel}}_1, \ldots, \overline{\text{sel}}_n]\}$ and tk as (S$_{f_1,3}$, ..., S$_{f_n,3}$, tk$_{f_1}$, ..., tk$_{f_n}$);
    2. for all $\overline{\text{sel}} \in \overline{\mathbf{Q}}$ with form $\{\text{f} : \blacksquare\}$,
       (a) if $f \in \mathbf{HC}$ set $U := \{1, \cdots, p\}$ otherwise set $U := \{0\}$;
       (b) parse tk$_f$ as $(f, \text{S}_f^\text{edc}, \text{S}_f^\text{esc}, \text{S}_f^\text{ecc})$;
       (c) for all $u \in U$, compute count$_{f,u}$ := GetCounter(S$_f^\text{esc}$, $u$);
       (d) compute count$_f$ := $\sum_{u \in U}$ count$_{f,u}$;
    3. for all $\overline{\text{sel}} \in \overline{\mathbf{Q}}$ with form $\{\text{f} : \{\$\text{gte} : \blacksquare, \$\text{lte} : \blacksquare\}\}$,
       (a) if $f \in \mathbf{HC}$ set $U := \{1, \cdots, p\}$ otherwise set $U := \{0\}$;
       (b) parse tk$_f$ as $\left(f, \left(\text{S}_{f,e}^\text{edc}, \text{S}_{f,e}^\text{esc}, \text{S}_{f,e}^\text{ecc}\right)_{e \in \mathbf{C}}\right)$;
       (c) for all $e \in \mathbf{C}$ and all $u \in U$, compute count$_{f,e,u}$ := GetCounter(S$_{f,e}^\text{esc}$, $u$);
       (d) compute count$_f$ := $\sum_{e \in \mathbf{C}, u \in U}$ count$_{f,e,u}$;
    4. for all $\overline{\text{sel}} \in \overline{\mathbf{Q}}$ with form $\{\$\text{not} : \{\text{f} : \{\$\text{gte} : \blacksquare, \$\text{lte} : \blacksquare\}\}\}$,
       (a) if $f \in \mathbf{HC}$ set $U := \{1, \cdots, p\}$ otherwise set $U := \{0\}$;
       (b) parse tk$_f$ as (tk$_{f,1}$, tk$_{f,2}$);
       (c) parse tk$_{f,1}$ as $\left(f, \left(\text{S}_{f,e}^\text{edc}, \text{S}_{f,e}^\text{esc}, \text{S}_{f,e}^\text{ecc}\right)_{e \in \mathbf{C}_1}\right)$;
       (d) parse tk$_{f,2}$ as $\left(f, \left(\text{S}_{f,e}^\text{edc}, \text{S}_{f,e}^\text{esc}, \text{S}_{f,e}^\text{ecc}\right)_{e \in \mathbf{C}_2}\right)$;
       (e) for all $e \in \mathbf{C}_1 \cup \mathbf{C}_2$ and all $u \in U$, compute count$_{f,e,u}$ := GetCounter(S$_{f,e}^\text{esc}$, $u$);
       (f) compute count$_f$ := $\sum_{e \in \mathbf{C}_1 \cup \mathbf{C}_2, u \in U}$ count$_{f,e,u}$;
    5. compute $f^*$ := argmin$_{f \in \mathbf{F}}$ {count$_f$}[a] and let $\overline{\text{sel}}^*$ be the selector with field $f^*$;

[a] If more than one $f$ minimizes the min function then choose one arbitrarily.

Figure 17: Emulated OST$_1$: Find with $and operators.

- db.collection.find(DEK, S, {$and : [sel$_1$, ···, sel$_n$]}):    (cont.)

– Server computes    (cont.)
        7. if $\overline{\text{sel}}^*$ has form {f* : ■} then for all $u \in U$,
            (a) compute $S_{f^*} := F_{S_{f^*}^{\text{edc}}}[u, 1]$;
            (b) compute $g_u := \text{GetGaps}(\text{ecc}, S_{f^*}^{\text{ecc}}, u)$;
            (c) for all $i \in \{1, \ldots, \text{count}_{f^*,u}\} \setminus g_u$, compute
            $$R := \text{db.edc.find}\left(\left\{\text{safeContent} : F_{S_{f^*}}(i)\right\}\right)$$
            (d) set EncResult := EncResult $\cup$ R;
        8. if $\overline{\text{sel}}^*$ has form {f* : {$gte : ■, $lte : ■}} then for all $e \in E_{f^*}$ and all $u \in U$,
            (a) compute $S_{f^*,e} := F_{S_{f^*,e}^{\text{edc}}}[u, 1]$;
            (b) compute $g_{f^*,e,u} := \text{GetGaps}(\text{ecc}, S_{f^*,e}^{\text{ecc}}, u)$;
            (c) for all $i \in \{1, \ldots, \text{count}_{f^*,e,u}\} \setminus g_{f^*,e,u}$, compute
            $$R := \text{db.edc.find}\left(\left\{\text{safeContent} : F_{S_{f^*,e}}(i)\right\}\right)$$
            (d) set EncResult := EncResult $\cup$ R;
        9. if $\overline{\text{sel}}_i$ has form {$not : {f* : ■}} compute EncResult := NotEqualFind(coll, eqtk) (see Figure 15);
        10. if $\overline{\text{sel}}^*$ has form {$not : {f* : {$gte : ■, $lte : ■}}} then for all $e \in E_{f^*,1} \cup E_{f^*,2}$ and all $u \in U$,
            (a) compute $S_{f^*,e} := F_{S_{f^*,e}^{\text{edc}}}[u, 1]$;
            (b) compute $g_{f^*,e,u} := \text{GetGaps}(\text{ecc}, S_{f^*,e}^{\text{ecc}}, u)$;
            (c) for all $i \in \{1, \ldots, \text{count}_{f^*,e,u}\} \setminus g_{f^*,e,u}$, compute
            $$R := \text{db.edc.find}\left(\left\{\text{safeContent} : F_{S_{f^*,e}}(i)\right\}\right)$$
            (d) set EncResult := EncResult $\cup$ R;
        11. for all ED $\in$ EncResult,
            (a) let Tags := [tags$_1$, ..., tags$_n$] be the array of the safeContent field of document ED;
            (b) for all $\overline{\text{sel}} \in \overline{Q} \setminus \overline{\text{sel}}^*$ with form {f : ■},
                i. compute flag := InTags(Tags, $S_f^{\text{edc}}$, ct$_f$, $S_{f,3}$, $U$);
                ii. if flag = false remove ED from EncResult;
            (c) for all $\overline{\text{sel}} \in \overline{Q} \setminus \overline{\text{sel}}^*$ with form {f : {$gte : ■, $lte : ■}},
                i. compute flag := InTags$\left(\text{Tags}, \{S_{f,e}^{\text{edc}}\}_{e \in C}, \text{ct}_f, S_{f,3}, U\right)$;
                ii. if flag = false remove ED from EncResult;
            (d) for all $\overline{\text{sel}} \in \overline{Q} \setminus \overline{\text{sel}}^*$ with form {$not : {f : ■}},
                i. compute flag := InTags(Tags, $\{S_f^{\text{edc}}\}$, ct$_f$, $S_{f,3}$, $U$);
                ii. if flag = true, remove ED from EncResult;
            (e) for all $\overline{\text{sel}} \in \overline{Q} \setminus \overline{\text{sel}}^*$ with form {$not : {f : {$gte : ■, $lte : ■}}},
                i. compute flag := InTags$\left(\text{Tags}, \{S_{f,e}^{\text{edc}}\}_{e \in C_1 \cup C_2}, \text{ct}_f, S_{f,3}, U\right)$;
                ii. if flag = false, remove ED from EncResult;
        13. send EncResult to client.
    – Client compute Result := Resolve(DEK, S, EncResult);

Figure 18: Emulated OST$_1$: Find with $and operators.

- db.collection.find(DEK, S, {$or : [sel$_1$, $\cdots$, sel$_n$]}):
  - Client computes MultiToken(S, sel$_1$, ..., sel$_n$):
    1. for all $1 \leq i \leq n$, compute $\overline{\text{sel}}_i := \text{scrub}(\text{sel}_i)$;
    2. let $(f_1, \cdots, f_n)$ be the fields in (sel$_1$, ..., sel$_n$);
    3. for all $1 \leq i \leq n$,
       (a) if sel$_i$ has form {f$_i$ : v} compute tk$_{f_i}$ := EqualToken(S, $f_i, v$);
       (b) if sel$_i$ has form {$not : {f$_i$ : v}} compute tk$_{f_i}$ := EqualToken(S, $f_i, v$);
       (c) if sel$_i$ has form {f$_i$ : {$gte : v$_1$, $lte : v$_2$}} compute tk$_{f_i}$ := RangeToken(S, $f_i, v_1, v_2$);
       (d) if sel$_i$ has form {$not : {f$_i$ : {$gte : v$_1$, $lte : v$_2$}},
          i. compute tk$_{i,1}$ := RangeToken(S, $f_i$, lBound, $v_1 - 10^{-\text{precision}}$);
          ii. compute tk$_{i,2}$ := RangeToken(S, $f_i$, $v_2 + 10^{-\text{precision}}$, uBound);
          iii. set tk$_{f_i}$ := (tk$_{i,1}$, tk$_{i,2}$);
    4. send $\overline{\mathbf{Q}} := \{\$or : [\overline{\text{sel}}_1, \ldots, \overline{\text{sel}}_n]\}$ and tk:=(tk$_{f_1}$, ..., tk$_{f_n}$) to the server.
  - Server computes OrFind($\overline{\mathbf{Q}}$, tk):
    1. initialize an empty set EncResult;
    2. parse $\overline{\mathbf{Q}}$ as {$and : [$\overline{\text{sel}}_1, \ldots, \overline{\text{sel}}_n$]} and tk as (tk$_{f_1}$, ..., tk$_{f_n}$);
    3. for all $\overline{\text{sel}} \in \overline{\mathbf{Q}}$ with form {f : ■},
       (a) compute $\mathbf{R}$ := EqualFind(tk$_f$);
       (b) set EncResult := $\cup \mathbf{R}$;
    4. for all $\overline{\text{sel}} \in \overline{\mathbf{Q}}$ with form {$not : {f : ■}},
       (a) compute $\mathbf{R}$ := NotEqualFind(tk$_f$);
       (b) set EncResult := $\cup \mathbf{R}$;
    5. for all $\overline{\text{sel}} \in \overline{\mathbf{Q}}$ with form {f : {$gte : ■, $lte : ■}},
       (a) compute $\mathbf{R}$ := RangeFind(tk$_f$);
       (b) set EncResult := $\cup \mathbf{R}$;
    6. for all $\overline{\text{sel}} \in \overline{\mathbf{Q}}$ with form {$not : {f : {$gte : ■, $lte : ■}}},
       (a) parse tk$_f$ as (tk$_{f,1}$, tk$_{f,2}$);
       (b) compute $\mathbf{R}_1$ := RangeFind(tk$_{f,1}$);
       (c) compute $\mathbf{R}_2$ := RangeFind(tk$_{f,2}$);
       (d) set EncResult := EncResult $\cup \mathbf{R}_1 \cup \mathbf{R}_2$;
    7. send EncResult to client;
  - Client computes and outputs Result := Resolve(DEK, S, EncResult).

Figure 19: Emulated OST$_1$: Find with $or operators.

- db.collection.find(DEK, S, {$or : [$C_1, \cdots, C_n$]}):
  - Client (Part 1):
    1. for all $i \in [n]$,
       (a) parse $C_1$ as {$and : [$sel_1, \cdots, sel_n$]};
       (b) compute $(\overline{Q}_i, tk_i) := \mathsf{MultiToken}(S, sel_1, \ldots, sel_n)$;
    2. send $\overline{Q} := (\overline{Q}_1, \cdots, \overline{Q}_n)$ and $tk := (tk_1, \cdots, tk_n)$ yo the server;
  - Server computes $\mathsf{BoolFind}(\overline{Q}, tk)$:
    1. initialize an empty set EncResult;
    2. for all $i \in \{1, \cdots, n\}$,
       (a) compute $R_i := \mathsf{AndFind}(\overline{Q}_i, tk_i)$;
       (b) add $R_i$ to EncResult;
    3. output EncResult.
  - Client computes and outputs Result := $\mathsf{Resolve}(DEK, S, \mathsf{EncResult})$.

Figure 20: Emulated $OST_1$: Find with disjunctive normal form queries.

- db.collection.delete(S, sel):
  - Client computes DeleteToken(S, sel):
    1. compute $\overline{sel} := \mathsf{scrub}(sel)$;
    2. if sel has form {f : v} compute $tk := \mathsf{EqualToken}(S, f, v)$;
    3. if sel has form {f : {$gte : v_1, $lte : v_2$}}, compute $tk := \mathsf{RangeToken}(S, f, v_1, v_2)$;
    4. send $\overline{sel}$ and
       $$dtk := \left(tk, \left(S_f^{ecoc}, S_{f,3}\right)_{f \in F}\right),$$
       to the server, where $S_{f,3} := F_S[f, 3]$ and $S_f^{ecoc} := F_S[f, 1, 4]$;
  - Server compute Delete($\overline{sel}$, dtk):
    1. parse dtk as $\left(tk, \left(S_f^{ecoc}, S_f\right)_{f \in F}\right)$;
    2. if $\overline{sel}$ has form {f : ■} compute EncResult := $\mathsf{EqualFind}(coll, tk)$;
    3. else if $\overline{sel}$ has form {f : {$gte : ■, $lte : ■}} compute EncResult := $\mathsf{RangeFind}(coll, tk)$;
    4. initialize a set $I = \emptyset$;
    5. for all $ED \in \mathsf{EncResult}$,
       (a) parse ED as $\left\{\{\_id : did\}, \{f : ct_f\}_{f \in F_{ED}}, \{safeContent : [tag_1, \ldots, tag_m]\}\right\}$;
       (b) for all $f \in F_{ED}$,
           i. compute $\mathsf{GarbageCollect}(did, f, S_f^{ecoc}, S_{f,3}, ct_f)$;
       (c) compute db.edc.delete({\_id : did});
       (d) set $I := I \cup did$;
    6. output I;

Figure 21: Emulated $OST_1$: Delete

- db.collection.update(S, sel, {$set : {f : v}}):
    - Client:
        1. compute $\overline{\text{sel}} := \text{scrub}(\text{sel})$;
        2. if $f \in \mathbf{EF}$,
            (a) if $f \in \mathbf{HC}$ sample $u \xleftarrow{\$} \{1, \cdots, p\}$, otherwise set $u := 0$;
            (b) compute $S_f^{\text{edc}} := F_S[f, 1, 1, v, u]$;
            (c) compute $S_f^{\text{esc}} := F_S[f, 1, 2, v, u]$;
            (d) compute $S_f^{\text{ecc}} := F_S[f, 1, 3, v, u]$;
            (e) compute $S_f^{\text{ecoc}} := F_S[f, 1, 4]$;
            (f) compute $\text{ct}_f^{\text{cp}} := \text{SKE.Enc}\left(S_f^{\text{ecoc}}, S_f^{\text{esc}} \| S_f^{\text{ecc}}\right)$;
            (g) compute $\text{ct}_f := \text{SKE.Enc}\,(K_f, v)$, where $K_f := \text{DEK}[\text{D} \| f]$;;
        3. else if $f \in \mathbf{RF}$,
            (a) compute $\mathbf{E}_f := \text{Edges}_{\text{SPH}}(v, \text{ntype}_f)$;
            (b) for all $e \in \mathbf{E}_f$,
                i. if $f \in \mathbf{HC}$ sample $u \xleftarrow{\$} \{1, \cdots, p\}$, otherwise set $u := 0$;
                ii. compute $S_{f,e}^{\text{edc}} := F_S[f, 1, 1, e, u]$;
                iii. compute $S_{f,e}^{\text{esc}} := F_S[f, 1, 2, e, u]$;
                iv. compute $S_{f,e}^{\text{ecc}} := F_S[f, 1, 3, e, u]$;
                v. compute $\text{ct}_{f,e}^{\text{cp}} := \text{SKE.Enc}\left(S_f^{\text{ecoc}}, S_{f,e}^{\text{esc}} \| S_{f,e}^{\text{ecc}}\right)$;
            (c) compute $\text{ct}_f := \text{SKE.Enc}\,(K_f, v)$, where $K_f := \text{DEK}[\text{D} \| f]$;
        4. if sel has form $\{\mathtt{f} : \mathtt{v}\}$, set $\text{tk} := \text{EqualToken}(S, f, v)$;
        5. else if sel has form $\{\mathtt{f} : \{\$\mathtt{gte} : \mathtt{v_1}, \$\mathtt{lte} : \mathtt{v_2}\}\}$ set $\text{tk} := \text{RangeToken}(S, f, v_1, v_2)$;
        6. compute $S_{f,3} := F_S[f, 3]$;
        7. if $f \in \mathbf{EF}$ set $\text{utk} := \left(\text{tk}, \text{ct}_f, S_f^{\text{ecoc}}, S_f^{\text{edc}}, S_f^{\text{esc}}, S_f^{\text{ecc}}, \text{ct}_f^{\text{cp}}, S_{f,3}\right)$;
        8. else if $f \in \mathbf{RF}$ set $\text{utk} := \left(\text{tk}, \text{ct}_f, S_f^{\text{ecoc}}, \left(S_{f,e}^{\text{edc}}, S_{f,e}^{\text{esc}}, S_{f,e}^{\text{ecc}}, \text{ct}_{f,e}^{\text{cp}}\right)_{e \in \mathbf{E}_f}, S_{f,3}\right)$;
        9. send $\overline{\text{sel}}$ and utk to the server;

Figure 22: Emulated $\text{OST}_1$: Update a single field (part 1).

- db.collection.update(S, sel, {$set : {f : v}}):   (cont.)
  - Server:   (cont.)
    1. if $\overline{\text{sel}}$ has form {f : ■}
        (a) parse utk as $\left(\text{tk}, \text{ct}_f, S_f^{\text{ecoc}}, S_f^{\text{edc}}, S_f^{\text{esc}}, S_f^{\text{ecc}}, \text{ct}_f^{\text{cp}}, S_{f,3}\right)$
        (b) compute EncResult := EqualFind(tk);
    2. else if $\overline{\text{sel}}$ has form {f : {$gte : ■, $lte : ■}}
        (a) parse utk as utk := $\left(\text{tk}, \text{ct}_f, S_f^{\text{ecoc}}, \left(S_{f,e}^{\text{edc}}, S_{f,e}^{\text{esc}}, S_{f,e}^{\text{ecc}}, \text{ct}_{f,e}^{\text{cp}}\right)_{e \in \mathbf{E}_f}, S_{f,3}\right)$;
        (b) compute EncResult := RangeFind(tk);
    3. for all ED ∈ EncResult,
        (a) parse ED as $\left\{\{\_\text{id} : \text{did}\}, \{f' : \text{ct}_{f'}\}_{f' \in \mathbf{F}_{\text{ED}}}, \{\text{safeContent} : \text{Tags}\}\right\}$;
        (b) compute GarbageCollect(did, $f, S_f^{\text{ecoc}}, S_{f,3}, \text{ct}_f$);
        (c) if $f \in \mathbf{EF}$,
            i. set $\mathbf{S} := \left\{\left(S_f^{\text{esc}}, S_f^{\text{edc}}, S_f^{\text{ecc}}, \text{ct}_f^{\text{cp}}\right)\right\}$;
            ii. compute $(\text{ct}'_f, \text{tag}_f) := \text{InsertFields}(\mathbf{S}, S_{f,3}, \text{ct}_f)$;
            iii. compute db.edc.update $(\{\_\text{id} : \text{did}\}, \{\$\text{pull} : \{\text{safeContent} : \text{tag}_f\}\})$;
        (d) if $f \in \mathbf{RF}$,
            i. set $\mathbf{S} := \left\{\left(S_{f,e}^{\text{esc}}, S_{f,e}^{\text{edc}}, S_{f,e}^{\text{ecc}}, \text{ct}_{f,e}^{\text{cp}}\right)_{e \in \mathbf{E}_f}\right\}$;
            ii. compute $(\text{ct}'_f, \text{tag}_1, \ldots, \text{tag}_m) := \text{InsertFields}(\mathbf{S}, S_{f,3}, \text{ct}_f)$;
            iii. for all $1 \le i \le m$, compute db.edc.update $(\{\_\text{id} : \text{did}\}, \{\$\text{pull} : \{\text{safeContent} : \text{tag}_i\}\})$;

(e) compute db.edc.update $(\{\_\text{id} : \text{did}\}, \{\$\text{set} : \{f : \text{ct}'_f\}\})$;

Figure 23: Emulated $\text{OST}_1$: Update a single field (part 2).

- db.collection.compact(S):
  - Client computes CompactionToken(S):
    1. send $ctk := (S_f^{ecoc})_{f \in \mathbf{F}}$ to the server, where $S_f^{ecoc} := F_S[f, 1, 4]$;.
  - Server computes Compaction(ctk):
    1. compute db.ecoc.renameCollection("ecoc*");
    2. compute db.createCollection("ecoc") ;
    3. for all $f \in \mathbf{F}$,
       (a) initialize a set $C_f$ and compute EncResult := db.ecoc*.find({field : $f$});
       (b) for all ED $\in$ EncResult,
          i. parse ED as {_id : $r$, field : $f$, value : ct};
          ii. compute $S^{esc} \| S^{ecc} := \text{SKE.Dec}(S_f^{ecoc}, ct)$;
          iii. if $S^{esc} \| S^{ecc} \notin C_f$,
             A. add $S^{esc} \| S^{ecc}$ to $C_f$ and compute $$S^1 := F_{S^{esc}}(1) \quad S^2 := F_{S^{esc}}(2) \quad S^3 := F_{S^{ecc}}(1) \quad \text{and} \quad S^4 := F_{S^{ecc}}(2)$$

B. compute $a \leftarrow \text{EmuBinary}(S^1, S^2, \text{"esc"})$;
             C. compute $tag := F_{S^1}(a)$;
             D. compute r := db.esc.find({_id : tag});
             E. parse r as {_id : tag, value : ct};
             F. compute $\sigma_1 \| \sigma_2 := \text{SKE.Dec}(S^2, ct)$;
             G. if $a = \bot$, then set pos := $\sigma_1 + 2$ and count := $\sigma_2$; otherwise if $a \geq 1$, then set pos := $a + 1$ and count := $\sigma_2$;
             H. compute $$\text{db.esc.insert}\left(\{\_id : F_{S^1}(pos), \text{value} : \text{SKE.Enc}(S^2, cp\|count)\}\right)$$

I. if the insertion fails due to a concurrent insertion or update, set pos := pos + 1 and count := count + 1, and retry;
             J. if $a \neq \bot$,
                A. compute r := db.esc.find({_id : $F_{S^1}(\bot)$});
                B. if r $\neq \bot$,
                   A. parse r as {_id : $F_{S^1}(\bot)$, value : ct},
                   B. compute $\sigma_1 \| \sigma_2 := \text{SKE.Dec}(S^4, ct)$;
                   C. set ipos := $\sigma_1 + 2$;
                D. otherwise set ipos := 1;
             E. otherwise set ipos := pos;

Figure 24: Emulated $OST_1$: Compaction (part 1).

- db.collection.compact(S, F):

- Server: *(cont.)*

J. set flag := true, initialize a set g;
        A. compute r := db.ecc.find({_id : $F_{S^3}(\perp)$});
        B. if r $\neq \perp$,
            A. parse r as {_id : $F_{S^3}(\perp)$, value : ct},
            B. compute $\sigma$ := SKE.Dec $(S^4, ct)$;
            C. set pos' := $\sigma + 2$;
        D. otherwise set pos' := 1;
        E. set ipos' := pos';
        F. while flag = true,
            A. compute tag := $F_{S^3}(pos')$
            B. compute r := db.ecc.find({_id : tag})
            C. if r $\neq \perp$,
                A. parse r as {_id : tag, value : ct},
                B. add SKE.Dec $(S^4, ct)$ to g and set pos' := pos' + 1;
            C. otherwise set flag := false;
        D. compute g' $\leftarrow$ Merge(g);
        E. if g' $\neq$ g, compute $$\text{db.ecc.insert}\left(\{\_id : F_{S^3}(pos'), value : SKE.Enc(S^4, cp)\}\right)$$

F. if the insertion fails due to a concurrent deletion or update, set pos' := pos' + 1 and retry the insertion;

Figure 25: Emulated $OST_1$: Compaction (part 2).

- db.collection.compact(S, F):
  - Server: *(cont.)*
    A. if $\{1, \cdots, \text{count}\} \setminus \mathbf{g}' \neq \emptyset$,
       A. if $\mathbf{g}' \neq \mathbf{g}$,
          A. compute for $k := \#\mathbf{g}'$ to 1, $\texttt{db.ecc.insert}\left(\{\_\texttt{id} : F_{S^3}(\text{pos}' + k), \texttt{value} : \text{SKE.Enc}\left(S^4, g'_k\right)\}\right)$ B. if $\text{ipos}' \neq 1$ $\texttt{db.ecc.update}\left(\{\_\texttt{id} : F_{S^3}(\bot), \{\$\text{set} : \{\texttt{value} : \text{SKE.Enc}\left(S^4, \text{pos}' - 1\right)\}\}\}\right)$ C. otherwise $\texttt{db.ecc.insert}\left(\{\_\texttt{id} : F_{S^3}(\bot), \texttt{value} : \text{SKE.Enc}\left(S^4, \text{pos}' - 1\right)\}\right)$ D. compute for all $k \in \{\text{ipos}', \cdots, \text{pos}'\}$ $\texttt{db.ecc.delete}\left(\{\_\texttt{id} : F_{S^3}(k)\}\right)$ E. compute for all $k \in \{\text{ipos}, \cdots, \text{pos}\}$ $\texttt{db.esc.delete}\left(\{\_\texttt{id} : F_{S^1}(k)\}\right)$ F. if $\text{ipos} \neq 1$, compute $\texttt{db.esc.update}(\{\_\texttt{id} : F_{S^1}(\bot)\}, \{\$\text{set} : \{\texttt{value} : \text{SKE.Enc}(S^2, \text{pos} - 1\|\text{count})\}\})$ G. otherwise, compute $\texttt{db.esc.insert}\left(\{\_\texttt{id} : F_{S^1}(\bot), \texttt{value} : \text{SKE.Enc}\left(S^2, \text{pos} - 1\|\text{count}\right)\}\right)$ B. otherwise,
       A. if $\text{ipos} = 1$, set $A = \{\text{ipos}, \cdots, \text{pos}\}$ and $B = \{\text{ipos}', \cdots, \text{pos}'\}$, otherwise set $A = \{\text{ipos}, \cdots, \text{pos}\} \cup \{\bot\}$ and $B = \{\text{ipos}', \cdots, \text{pos}'\} \cup \{\bot\}$;
       B. compute for all $k \in A$, $\texttt{db.esc.delete}\left(\{\_\texttt{id} : F_{S^1}(k)\}\right)$ C. compute for all $k \in B$, $\texttt{db.ecc.delete}\left(\{\_\texttt{id} : F_{S^3}(k)\}\right)$ 5. compute db.ecoc*.drop().

Figure 26: Emulated $\text{OST}_1$: Compaction (part 3).

- db.collection.gdprerase(DEK, S, sel):
  - Client computes (DEK, S, sel):
    1. compute dtk := DeleteToken(S, sel);
    2. send gdprtk := dtk to the server;
  - Server computes (gdprtk):
    1. parse gdprtk as dtk;
    2. compute $(did_1, \ldots, did_m) := $ Delete(dtk);
    3. send $(did_1, \ldots, did_m)$ to client;
  - Client GDPRClean(DEK, $did_1, \ldots, did_m$) computes:
    1. let $D_i$ be the document with document _id $= did_i$;
    2. for all $1 \leq i \leq m$ and all $f \in \mathbf{F}_{D_i}$ set DEK$[did_i \| f] := \bot$;

Figure 27: Emulated $OST_1$: GDPRErase.

- EmuBinary("coll", $S_1, S_2,$):
  1. compute
  $$r := \text{db.coll.find}(\{\_id : F_{S_1}(\bot)\})$$
  2. if $r \neq \bot$,
     (a) parse r as $\{\_id : F_{S_1}(\bot), \text{value} : ct\}$;
     (b) parse SKE.Dec($S_2$, ct) as pos$\|$count if coll = "esc" or pos if coll = "ecc";
     (c) set $\lambda := $ pos $+ 1$ and $i := \bot$;
  3. otherwise, set $i := 0$ and $\lambda := 0$;
  4. compute r := db.coll.count();
  5. parse r as $\{$"n" $: \rho\}$;
  6. set flag := true;
  7. while flag = true,
     (a) compute r := db.coll.find($\{\_id : F_{S_1}(\rho + \lambda)\}$);
     (b) if $r \neq \bot$, then set $\rho := 2\rho$, otherwise set flag := false;
  8. set median := 0, min := 1 and max := $\rho$;
  9. for $1 \leq j \leq \lceil \log(\rho) \rceil$,
     (a) set median := $\lceil (\text{max} - \text{min})/2 \rceil + $ min;
     (b) compute r := db.coll.find($\{\_id : F_{S_1}(\text{median} + \lambda)\}$);
     (c) if $r \neq \bot$,
         i. set min := median;
         ii. if $j = \lceil \log(\rho) \rceil$, then set $i := $ min $+ \lambda$;
     (d) otherwise if $r := \bot$,
         i. set max := median;
         ii. if $j = \lceil \log(\rho) \rceil$ and min $= 1$,
             A. compute r := db.coll.find($\{\_id : F_{S_1}(1 + \lambda)\}$)
             B. if $r \neq \bot$, then set $i := 1 + \lambda$;
         iii. otherwise if $j = \lceil \log(\rho) \rceil$ and min $\neq 1$, then set $i := $ min $+ \lambda$;
  10. output $i$.

Figure 28: The emulated binary search subroutine.

- GetCounter(S, $u$):
    1. compute $S_1 := F_S[u, 1]$ and $S_2 := F_S[u, 2]$;
    2. compute $a \leftarrow$ EmuBinary(esc, $S_1, S_2$);
    3. if $a = 0$, set count $:= 0$, otherwise,
        (a) compute $r := \text{db.esc.find}(\{\_id : F_{S_1}(a)\})$;
        (b) parse $r$ as $\{\_id : \text{tag}, \text{value} : \text{ct}\}$;
        (c) compute $\sigma_1 \| \sigma_2 := \text{SKE.Dec}(S_2, \text{ct})$;
        (d) set count $:= \sigma_2$;
    4. output count.

Figure 29: The GetCounter subroutine.

- InsertFields(S, $S_{f,3}, \text{ct}_f$):
    1. parse S as $\{(S_1^{esc}, S_1^{edc}, S_1^{ecc}), \ldots, (S_m^{esc}, S_m^{edc}, S_m^{ecc})\}$;
    2. parse $\text{ct}^{cp}$ as $(\text{ct}_1^{cp}, \ldots, \text{ct}_m^{cp})$;
    3. for all $1 \leq i \leq m$,
        (a) compute $S_{i,1} := F_{S_i^{esc}}(1)$ and $S_{i,2} := F_{S_i^{esc}}(2)$;
        (b) compute $a \leftarrow$ EmuBinary($S_{i,1}, S_{i,2}$, "esc");
        (c) if $a = 0$, set $\text{pos}_i := 1$ and $\text{count}_i := 1$; otherwise
            i. compute $r := \text{db.esc.find}\left(\{\_id : F_{S_{i,1}}(a)\}\right)$
            ii. parse $r$ as $\{\_id : \text{did}_i, \text{value} : \text{ct}\}$;
            iii. compute $\sigma_1 \| \sigma_2 := \text{SKE.Dec}(S_{i,2}, \text{ct})$;
            iv. if $\sigma_1 = \text{cp}$, then abort;
            v. if $a = \bot$, set $\text{pos}_i := \sigma_1 + 2$ and $\text{count}_i := \sigma_2 + 1$; otherwise set $\text{pos}_i := a + 1$ and $\text{count}_i := \sigma_2 + 1$;
        (d) compute $\text{db.esc.insert}\left(\{\_id : F_{S_{i,1}}(\text{pos}_i), \text{value} : \text{SKE.Enc}(S_{i,2}, 0\|\text{count}_i)\}\right)$
        (e) compute $\text{tag}_i := F_{S_i^{esc}}[1, \text{count}_i]$;
        (f) sample a random value $r \xleftarrow{\$} \{0,1\}^k$ and compute $$\text{db.ecoc.insert}\left(\{\_id : r, \text{field} : f, \text{value} : \text{ct}_i^{cp}\}\right)$$

4. compute $\text{ct}_f' := \text{SKE.Enc}\left(S_{f,3}, \text{ct}_f \| \text{count}_1 \| S_1^{edc} \| S_1^{esc} \| S_1^{ecc} \| \cdots \| \text{count}_m \| S_m^{edc} \| S_m^{esc} \| S_m^{ecc}\right)$;
    5. output $(\text{ct}_f', \text{tag}_1, \ldots, \text{tag}_m)$.

Figure 30: The InsertFields subroutine.

- GetGaps(S, $u$):
    1. compute $S_1 := F_S[u, 1]$ and $S_2 := F_S[u, 2]$;
    2. compute r := db.ecc.find({_id : $F_{S_1}(\bot)$});
    3. if r $\neq \bot$,
        (a) parse r as {_id : $F_{S_1}(\bot)$, value : ct};
        (b) compute $\sigma$ := SKE.Dec($S_2$, ct);
        (c) set pos := $\sigma + 2$;
    4. otherwise set pos := 1;
    5. set flag := true and initialize a set g;
    6. while flag = true,
        (a) compute r := db.ecc.find({_id : $F_{S_1}(\text{pos})$})
        (b) if r $\neq \bot$,
            i. parse r as {_id : $F_{S_1}(\text{pos})$, value : ct};
            ii. compute $\sigma$ := SKE.Dec($S_2$, ct);
            iii. if $\sigma \neq$ cp, add $\sigma$ to g, otherwise set flag := false;
            iv. set pos := pos + 1;
        (c) otherwise set flag := false;
    7. output g.

Figure 31: The GetGaps subroutine.

- InTags(Tags, S, $\text{ct}_f$, $S_{f,3}$, $U$):
    1. compute ct$\|x_1\| \cdots \|x_n$ := SKE.Dec($S_{f,3}$, $\text{ct}_f$);
    2. for all $1 \leq i \leq n$, parse $x_i$ as $\text{count}_i \|S_i^{\text{edc}}\|S_i^{\text{esc}}\|S_i^{\text{ecc}}$;
    3. if $f \in \mathbf{HC}$, then set $U := \{1, \ldots, p\}$ otherwise set $U := \{0\}$;
    4. set flag := false;
    5. for all $S \in \mathbf{S}$ and all $u \in U$,
        (a) compute $S_1 := F[S, u, 1]$;
        (b) if there exists $1 \leq i \leq n$ such that $F_{S_1}(\text{count}_i) \in$ Tags, set flag = true and exit the loop;
    6. output flag.

Figure 32: The InTags subroutine.

- GarbageCollect(did, $f, S_f^{ecoc}, S_f, ct_f$):
    1. compute ct := SKE.Dec($S_f, ct_f$) and parse ct as $ct'_f \| x_1 \| \cdots \| x_n$;
    2. for $1 \leq i \leq n$,
        (a) parse $x_i$ as $count_i \| S_i^{edc} \| S_i^{esc} \| S_i^{ecc}$;
        (b) compute $S_1 := F_{S_i^{ecc}}(1)$ and $S_2 := F_{S_i^{ecc}}(2)$;
        (c) compute $a \leftarrow$ EmuBinary($S_1, S_2$, "ecc");
        (d) if $a \neq 0$,
            i. compute $r :=$ db.ecc.find($\{\_id : F_{S_1}(a)\}$)
            ii. parse r as $\{\_id : rid, value : ct_r\}$;
            iii. compute $\sigma :=$ SKE.Dec($S_2, ct_r$);
            iv. if $\sigma =$ cp, then abort;
        (e) if $a = \bot$, compute tag $:= F_{S_1}(\sigma + 2)$, otherwise if $a = 0$ compute tag $:= F_{S_1}(1)$, otherwise compute tag $:= F_{S_1}(a + 1)$;
        (f) compute $ct_i :=$ SKE.Enc($S_2, count_i$);
        (g) compute db.ecc.insert($\{\_id :$ tag, value $: ct_i\}$);
        (h) sample $r \xleftarrow{\$} \{0,1\}^k$ and compute $$\text{db.ecoc.insert}(\{\_id : r, \text{field} : f, \text{value} : \text{SKE.Enc}(S_f^{ecoc}, S_i^{esc} \| S_i^{ecc})\})$$

(i) compute $tag_i := F[S_i^{edc}, 1, count_i]$;
        (j) compute db.edc.update($\{\_id : did\}, \{\$pull : \{safeContent : tag_i\}\}$);

Figure 33: The GarbageCollect subroutine.

- Mincover$_{SPH}$([$a, b$], ntype):
    1. compute $a_0 \cdots a_n \leftarrow$ BitRep($a$, ntype);
    2. compute $b_0 \cdots b_n \leftarrow$ BitRep($b$, ntype);
    3. set $N := 2^n$;
    4. parse ntype as (precision, lBound, uBound, $\theta$);
    5. output Mincover$_{N,\theta}$([$a_0 \cdots a_n, b_0 \cdots b_n$]).

- Mincover$_{N,\theta}$([$a_0 \cdots a_i, b_0 \cdots b_i$]):
    1. find $j \in \{0, \cdots, i\}$ s.t. $a_0 \cdots a_j := b_0 \cdots b_j$ and set $x := a_0 \cdots a_j$;
    2. if $[x0^{\log N - |x|}, x1^{\log N - |x|}] \subseteq [a_0 \cdots a_i, b_0 \cdots b_i]$,
        (a) find $\lambda$ s.t. $2^{\lambda \cdot \theta} \leq 2^{\log N - |x|} < 2^{(\lambda+1)\theta}$;
        (b) set $y := \log N - |x| - \lambda \cdot \theta$;
        (c) if $y \neq 0$, for all $p_1 \cdots p_y \in \{0,1\}^y$, add $xp_1 \cdots p_y$ to $\mathbf{C}$, otherwise add $x$ to $\mathbf{C}$;
    3. otherwise if $|x| < \log N$,
        (a) compute Mincover$_{N,\theta}$([$a_0 \cdots a_i, x01^{\log N - |x| - 1}$]);
        (b) compute Mincover$_{N,\theta}$([$x10^{\log N - |x| - 1}, b_0 \cdots b_i$]).

Figure 34: The Mincover algorithm.

- Edges$_{\mathsf{SPH}}$($v$, ntype):
    1. compute $a_0 \cdots a_n \leftarrow$ BitRep($v$, ntype)
    2. initialize an empty set $\mathbf{C}$ and set $N := 2^n$;
    3. parse ntype as (precision, lBound, uBound, $\theta$);
    4. for $i := 0$ to $\log N$,
        (a) if $\log N - i \in \{i \cdot \theta\}^{\lfloor \theta^{-1} \cdot \log N \rfloor}$, then add $a_0 \cdots a_i$ to $\mathbf{C}$;
    5. output $\mathbf{C}$.

Figure 35: The Edges algorithm.

- BitRep($v$, ntype):
    1. parse ntype as (precision, lBound, uBound, $\theta$);
    2. compute $x := v \cdot 10^{\mathsf{precision}} - \mathsf{lBound} \cdot 10^{\mathsf{precision}}$;
    3. compute $N := \mathsf{uBound} \cdot 10^{\mathsf{precision}} - \mathsf{lBound} \cdot 10^{\mathsf{precision}}$;
    4. let $b_1 \cdots b_{\log N}$ be the binary representation of $x$ s.t. $x := \sum_{i:=1}^{\log N} b_i \cdot 2^{\log N - i}$;
    5. set $b_0 := \bot$;
    6. output $b_0 \cdots b_{\log N}$.

Figure 36: The BitRep algorithm.

SYSTEMS AND METHODS FOR END-TO END-ENCRYPTION WITH ENCRYPTED MULTI-MAPS

RELATED APPLICATIONS

This Application claims priority under 35 U.S.C. § 119 to U.S. Provisional Application Ser. No. 63/349,208, entitled "SYSTEMS AND METHODS FOR END-TO END-ENCRYPTION WITH ENCRYPTED MULTI-MAPS", filed Jun. 6, 2022. This Application claims priority under 35 U.S.C. § 120 to and is a continuation in part of U.S. patent application Ser. No. 17/570,730, now issued as U.S. Pat. No. 12,039,073 entitled "SYSTEMS AND METHODS USING EMULATION FOR END TO END ENCRYPTION", filed Jan. 7, 2022, which claims priority under 35 U.S.C. § 120 to and is a continuation in part of U.S. patent application Ser. No. 17/563,425, entitled "SYSTEMS AND METHODS USING EMULATION FOR END TO END ENCRYPTION", filed Dec. 28, 2021, which claims priority under 35 U.S.C. § 120 to and is a continuation in part of U.S. patent application Ser. No. 17/514,681, entitled "SYSTEMS AND METHODS USING EMULATION FOR END TO END ENCRYPTION", filed Oct. 29, 2021, which claims priority under 35 U.S.C. § 119 to U.S. Provisional Application Ser. No. 63/135,053, entitled "SYSTEMS AND METHODS USING EMULATION FOR END TO END ENCRYPTION" filed Jan. 8, 2021. Application Ser. No. 17/514,681 claims priority under 35 U.S.C. § 119 to U.S. Provisional Application Ser. No. 63/132,063, entitled "SYSTEMS AND METHODS USING EMULATION FOR END TO END ENCRYPTION", filed Dec. 30, 2020. Application Ser. No. 17/514,681 claims priority under 35 U.S.C. § 119 to U.S. Provisional Application Ser. No. 63/131,487, entitled "SYSTEMS AND METHODS USING EMULATION FOR END TO END ENCRYPTION", filed Dec. 29, 2020. application Ser. No. 17/563,425 claims priority under 35 U.S.C. § 119 to U.S. Provisional Application Ser. No. 63/135,053, entitled "SYSTEMS AND METHODS USING EMULATION FOR END TO END ENCRYPTION", filed Jan. 8, 2021. Application Ser. No. 17/563,425 claims priority under 35 U.S.C. § 119 to U.S. Provisional Application Ser. No. 63/132,063, entitled "SYSTEMS AND METHODS USING EMULATION FOR END TO END ENCRYPTION", filed Dec. 30, 2020. Application Ser. No. 17/563,425 claims priority under 35 U.S.C. § 119 to U.S. Provisional Application Ser. No. 63/131,487, entitled "SYSTEMS AND METHODS USING EMULATION FOR END TO END ENCRYPTION", filed Dec. 29, 2020. Application Ser. No. 17/570,730, now issued as U.S. Pat. No. 12,039,073 claims priority under 35 U.S.C. § 120 to and is a continuation in part of U.S. patent application Ser. No. 17/514,681, entitled "SYSTEMS AND METHODS USING EMULATION FOR END TO END ENCRYPTION", filed Oct. 29, 2021. Application Ser. No. 17/570,730, now issued as U.S. Pat. No. 12,039,073 claims priority under 35 U.S.C. § 119 to U.S. Provisional Application Ser. No. 63/135,053, entitled "SYSTEMS AND METHODS USING EMULATION FOR END TO END ENCRYPTION", filed Jan. 8, 2021, each of which is incorporated by reference in their entirety.

COPYRIGHT NOTICE

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Implementing end-to-end encryption poses many challenges in the data management and database spaces. The goal of such encryption approaches is to provide a completely secure set of data for any client, irrespective of platform. Even when data is fully encrypted, there are opportunities for adversaries to exploit data leakage to learn about underlying encrypted data, where the opportunities for leakage depend on the underlying encrypted search design as well as on the adversarial model being considered.

SUMMARY

According to some aspects, provided are systems and methods that implement end-to-end encryption, and provide implementation configured to secure information during execution of queries on a data source. Various embodiments include multiple encrypted multi-map data structures and associated encryption schemes configured to securely read, write, and delete information while supporting any one or more of the following features: snapshot security, multiple client support, efficient execution under concurrent operation, and resilience to client failures.

According to various aspects, provided are descriptions of encryption schemes for implementing end-to-end encryption in document oriented database systems, semi-structured, and/or unstructured database systems. According to one embodiment, a database system can include an OST1 construction. According one example, OST1 describes a (e.g., document) database encryption scheme that is configured to enable any one or more of the following features: (1) snapshot security; (2) support for multiple clients; (3) efficient support for concurrent operations; and (4) resilience to client failures. Further embodiments provide "lightweight clients"—in the sense that the implementation does not require or assume that the clients can have large memory or have access to a non-conventional computational power. Still other embodiments enable resilience to "server crashes," and also provide for "scalability." For example, the system can support scalable architecture and work in sharded clusters of the known MongoDB database (among other options). Some embodiments are configured to provide efficient search, updates and deletes, low storage overhead, and expressive queries including for example, support for more than point queries.

According to one aspect, a database system is provided. The system comprises at least one processor operatively connected to a memory, the at least one processor when executing configured to: enable end-to-end encryption of plaintext data via an emulation of a database implementation (e.g., distributed database, dynamic schema database, known MongoDB database, etc.); accept and process queries against the emulation of the database implementation, such that the queries operate on and retrieve encrypted data from the emulation; instantiate the emulation of the database implementation, the emulation including: at least a first encrypted data structure (e.g., multi-map, addressable multi-map, etc.) configured to: store encrypted representations of the plaintext data; link multi-dimension labels to respective encrypted representations in the first encrypted data structure; receive and execute database operations against the encrypted representations using the multi-dimension labels;

and at least a second encrypted data structure (e.g., multi-map, addressable multi-map, etc.) configured to: store encrypted metadata associated with the first encrypted data structure; and prevent overwrite conditions from occurring on the first encrypted data structure using the encrypted metadata.

According to one embodiment, the at least one processor is further configured to receive and execute concurrent database operations against the first encrypted data structure. According to one embodiment, the at least one processor is further configured to receive and execute concurrent database operations against the second encrypted data structure. According to one embodiment, the at least one processor is further configured to receive and execute stateless database operations against the first encrypted data structure. According to one embodiment, the at least one processor is further configured to receive and execute stateless database operations against the second encrypted data structure. According to one embodiment, the emulation further comprises a third encrypted data structure configured to store gap information for the multi-dimension labels and respective encrypted representations.

According to one embodiment, the third encrypted data structure is configured to limit reads executed on the first encrypted data structure to occur on locations in the first encrypted data structure having existing data. According to one embodiment, the at least one processor is further configured to receive and execute concurrent and/or stateless database operations against the third encrypted data structure. According to one embodiment, the emulation further comprises an encrypted set structure configured to: store operation tokens generated for database operations on the second and third encrypted data structures; and enable compaction of the second and/or third encrypted data structures. According to one embodiment, the emulation further comprises an encrypted range data structure (e.g., multi-map, addressable multi-map, etc.) configured to: store encrypted representations of the plaintext data; and receive and execute range delimited database operations against the encrypted representations.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 1 is an example stateless addressable two-dimensional multi-map encryption scheme, according to one embodiment;

FIG. 2 is an example stateless two-dimensional dictionary encryption scheme, according to one embodiment;

FIG. 3 is an example stateless two-dimensional multi-map encryption scheme according to one embodiment;

FIG. 4 is an example stateless two-dimensional multi-map encryption scheme, according to one embodiment;

FIG. 5 is an example stateless enumerable encrypted set scheme, according to one embodiment;

FIG. 6 is an example binary search subroutine, according to one embodiment;

FIG. 7 is an example merge subroutine, according to one embodiment;

FIG. 8 is an example stateless multi-map encryption scheme, according to one embodiment;

FIG. 9 is an example stateless multi-map encryption scheme, according to one embodiment;

FIG. 10 is an example stateless multi-map encryption scheme, according to one embodiment;

FIG. 11 is an example stateless range multi-map encryption scheme, according to one embodiment;

FIG. 12 is an example emulated function for collection creation, according to one embodiment;

FIG. 13 is an example emulated function for insert, according to one embodiment;

FIG. 14 is an example emulated function for find, according to one embodiment;

FIG. 15 is an example emulated function for find, according to one embodiment;

FIG. 16 is an example emulated function for find, according to one embodiment;

FIG. 17 is an example emulated function for find, according to one embodiment;

FIG. 18 is an example emulated function for find, according to one embodiment;

FIG. 19 is example emulated function for find, according to one embodiment;

FIG. 20 is an example emulated function for find, according to one embodiment;

FIG. 21 is an example emulated function for delete, according to one embodiment;

FIG. 22 is an example emulated function for update, according to one embodiment;

FIG. 23 is an example emulated function for update, according to one embodiment;

FIG. 24 is an example emulated function for compaction, according to one embodiment;

FIG. 25 is an example emulated function for compaction, according to one embodiment;

FIG. 26 is an example emulated function for compaction according to one embodiment;

FIG. 27 is an example emulated function for erase, according to one embodiment;

FIG. 28 is an example emulated binary search subroutine, according to one embodiment;

FIG. 29 is an example emulated function for a get counter subroutine, according to one embodiment;

FIG. 30 is an example emulated function for an insert field subroutine, according to one embodiment;

FIG. 31 is an example emulated function for a get caps subroutine, according to one embodiment;

FIG. 32 is an example subroutine, according to one embodiment;

FIG. 33 is an example subroutine, according to one embodiment;

FIG. 34 is an example subroutine, according to one embodiment;

FIG. 35 is an example algorithm, according to one embodiment;

FIG. 36 is an example algorithm, according to one embodiment; and

DETAILED DESCRIPTION

Figure 37:
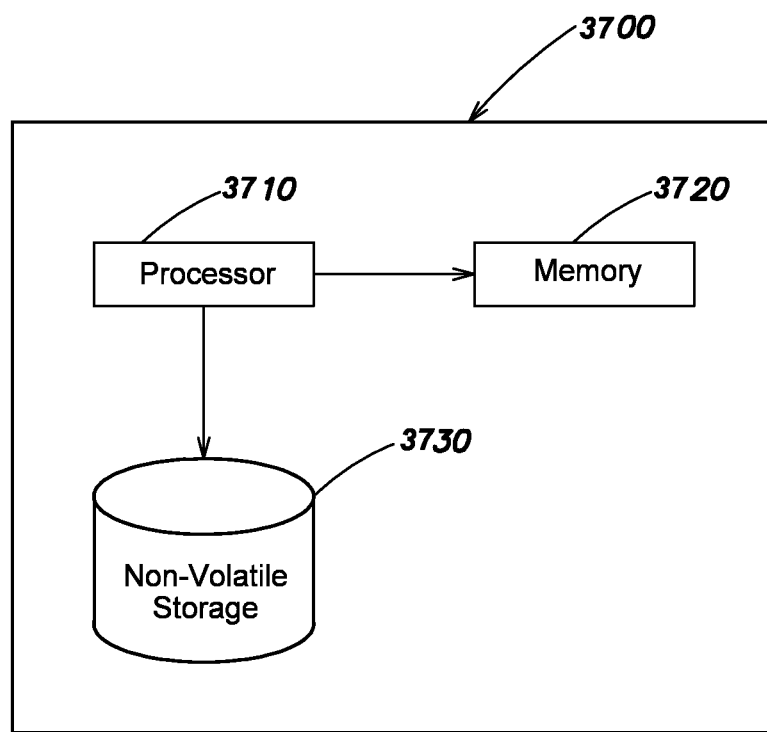
FIG. 37 is a block diagram of an example computer system improved by implementation of the functions, operations, and/or architectures described herein.

To facilitate understanding of elements of the end-to-end encrypted database and example encryption schemes, described are consideration for construction of OST1 and underlying development of two new multi-map encryption schemes $\Omega_P$ and $\Omega_R$ that achieve any one or more or any combination of the properties above (e.g., 1-4), in various examples. $\Omega_R$ is an example range multi-map encryption scheme that can be used. $\Omega_R$ itself based on $\Omega_P$ and $\Omega_P$ is based on multiple data structure encryption schemes that each achieve different characteristics and can be used for different purposes. Example considerations and implementation for the schemes are discussed in detail below.

Various embodiments enhance security over conventional approaches. For example, security can be enhanced over conventional implementation when considering a snapshot adversary. A (memory-level) snapshot adversary has access to the entire memory and disk of a server at a particular point in time. This means that at that instant, the adversary can access the entire database, any keys stored in memory, all the caches and all the logs. Some approaches exist that include snapshot-secure structured encryption. While such approaches exist, they are very complex and do not support the properties above. As is described in further detail below, example schemes $\Omega_P$ and $\Omega_R$, are more efficient than known approaches and provide enhanced security guarantees.

According to various embodiments, the system supports databases that are accessed by multiple clients. Further, the implementation of the underlying structured encryption ("STE") scheme can be configured to support a multi-writer multi-reader ("MWMR") setting. In a multi-writer setting, clients can issue put operations (described in greater detail below) at the same time which can cause contention and reduce write throughput. Various embodiments resolve the complexity of multi-writer settings and improve over various known single writer approaches. To the inventors' awareness, the various embodiments described are the first multi-writer multi-reader structured encryption schemes.

Various conventional dynamic multi-map encryption schemes require the client to keep state. State becomes difficult to manage in a multi-client setting, for example, because clients need to maintain a consistent view of state. Another important consideration is that clients can crash at any time and cause state information to be lost. Various embodiments are configured to provide crash recovery protocols that are efficient. Some embodiments resolve the state issue by removing the consideration under a stateless architecture.

Construction Examples and Notation: The set of all binary strings of length n is denoted as $\{0, 1\}^n$, and the set of all finite binary strings as $\{0, 1\}^*$. [n] is the set of integers $\{1, \ldots, n\}$. The output y of a probabilistic algorithm A on input x is denoted by $y \rightarrow A(x)$. The output y of a deterministic algorithm A on input x is denoted by $y:=A(x)$. If S is a set then $$x \xleftarrow{s} S$$

denotes sampling from S uniformly at random. Given a sequence s of n elements, the description refers to its ith element as $s_i$. If S is a set then #S refers to its cardinality. Throughout, k will denote the security parameter.

Example Dictionaries & multi-maps. A dictionary DX with capacity n is a collection of n label/value pairs $\{(\ell_i, v_i)\}_{i \leq n}$ and supports Get and Put operations. $v_i := DX[\ell_i]$ denotes getting the value associated with label $\ell_i$ and $DX[\ell_i] := v_i$ denotes the operation of putting the value vi in DX with label $\ell_i$.

A multi-map "MM" with capacity n is a collection of n label/tuple pairs $\{(\ell_i, v_i)\}_{i \leq n}$ that supports Get and Put operations. $v_i = MM[\ell_i]$ denotes getting the tuple associated with label $\ell_i$ and $MM[\ell_i] = v_i$ to denote operation of associating the tuple $v_i$ to label $\ell_i$. Multi-maps are an abstract data type instantiated by an inverted index. In further example, the system can define a range multi-map "RMM" that supports—in addition to Get and Put operations—range queries: given a range $[a, b] \subseteq Z^2$, return the set of values $V = \bigcup_{\ell \in [a,b]} RMM[\ell]$. V=RMM[[a, b]] denotes getting the values associated with the range [a, b].

Example source databases can include any structured or semi-structured database. Various embodiments are configured to manage document databases. A document database DDB of size n holds n documents D1, ..., Dn each of which is a set of field/value pairs. Various examples described herein are discussed under the assumption of documents in a database that have the same number of field/value pairs. More precisely, for all $1 \leq i \leq n$, $D_i = (f_1, v_1), \ldots, (f_m, v_m)$. The examples are provided to illustrate operations and facilitate understanding and are not limited to such cases, and in other embodiments are configured to manage databases and documents having varying numbers of field/value pairs.

Examples are discussed that include document databases with fields that support the following exact queries and range queries. For example, an exact search query takes as input a field/value pair (f, v) and returns the documents in DDB that include the field f with value v. A range search query takes as input a range [a, b] instead of a single value and returns the documents in DDB that include the field f with values between a and b.

Various embodiments and operations are discussed with respect to the known MongoDB database and its mongo shell query and update operations. Other embodiments can be employed with different databases and query/update operations.

Example cryptographic primitives are included in, for example, a symmetric-key encryption scheme. The symmetric-key encryption scheme is a set of three polynomial-time algorithms SKE=(Gen, Enc, Dec) where Gen is a probabilistic algorithm that takes a security parameter k and returns a secret key K; Enc is a probabilistic algorithm that takes a key K and a message m and returns a ciphertext c; Dec is a deterministic algorithm that takes a key K and a ciphertext c and returns m if K was the key under which c was produced.

Informally, a private-key encryption scheme is secure against chosen-plaintext attacks (CPA) if the ciphertexts it outputs do not reveal any partial information about the plaintext even to an adversary that can adaptively query an encryption oracle. A scheme is random-ciphertext-secure against chosen-plaintext attacks (RCPA) if the ciphertexts the scheme outputs are computationally indistinguishable from random even to an adversary that can adaptively query an encryption oracle. In some examples, RCPA-secure encryption can be instantiated practically using either the standard PRF-based private-key encryption scheme or, e.g., AES in counter mode. In addition to encryption schemes, the system can be configured to leverage pseudo-random functions (PRF), which are polynomial-time computable functions that cannot be distinguished from random functions by any probabilistic polynomial-time adversary. In the following examples, described are the evaluation of a pseudo-random function F with a key K on an input x as $F_K(x)$ but sometimes as F (K, x) for visual clarity. Also the notation $F_K[s_1, s_2, \ldots, s_n]$ can be used to mean F (F (F (K, $s_1$), $s_2$) . . . ), $s_n$). Various formal security definitions are known and include those described in Introduction to Modern Cryptography, by J. Katz and Y. Lindell, (2008).

Various embodiments employ hypergraph data structures. A hypergraph H=(V, E) consists of a set of n vertices V=$v_1, \ldots, v_n$ and a collection of m non-empty edges E=$e_1, \ldots, e_m$ such that, for all i∈[m], $e_i \subseteq V$. The degree of a vertex v E V is the number of edges in E that contain v and is denoted by deg(v). In the following, described is a range hypergraph, H=(V, E) such that V is a total order and such that for all ranges r∈R(V), there exists a subset $C_r \subseteq E$ such that $U_{e \in C_r} e = r$, referred to as a cover of the range r. The min-cover of a range r⊆V is the set $$C_r = \mathrm{argmin}_{C \subseteq E}\left\{ \# \ C: \ \bigcup_{e \in C} e = r \right\}.$$

In various embodiments, the system includes two efficient algorithms: $\mathrm{Edges}_H$ and $\mathrm{Mincover}_H$. In some examples, $\mathrm{Edges}_H$ takes as input a vertex v and outputs the subset of edges $E_v \subseteq E$ that include v. In other examples, Mincover takes as input a range r E R(V) and outputs its min-cover $C_r$. The two efficient algorithms permit use of a hypergraph H in various constructions.

Various embodiments include a stateless multi-map encryption scheme $\Omega_P$. In various examples, $\Omega_p$ evolved and improved over some known multi-map encryption schemes. In various embodiments, the underlying encryption schemes were adapted and improved, and each one modified to have different characteristics and ultimately used for different purposes. At a high level, the first scheme, $\Sigma_M$, can be used to encrypt the input multi-map which results in the main encrypted multi-map $\mathrm{EMM}_M$. The second scheme, $\Sigma_C$, can be used to encrypt metadata about the main encrypted multi-map (e.g., that can be used to avoid overwriting items in $\mathrm{EMM}_M$). The third scheme, $\Sigma_D$, can be used to store information about items deleted in the main encrypted multi-map (e.g., in order to speed up queries on $\mathrm{EMM}_M$). The last scheme, $\Sigma_P$, can be used to store information that can be needed to compact the auxiliary structures. Compacting the auxiliary structures reduces their space consumption. The following description describes examples of the underlying encryption schemes, optimizations, improvements, and purposes.

Example Two-Dimensional Addressable Encrypted Data Structures

As mentioned above, various embodiments include scheme $\Omega_p$, which can employ a first scheme $\Sigma_M$ to encrypt an input multi-map MM, resulting in the "main" encrypted multi-map $\mathrm{EMM}_M$. In various examples, $\Sigma_M$ is a $\pi_{dyn}$-style construction that has been adapted to improve security and operation over known $\pi_{dyn}$-style constructions. For example, $\Sigma_M$ is part of a two-dimensional multi-map encryption scheme (described in greater detail below). Further $\Sigma_M$ is configured to be stateless. This architecture can be implemented at the cost of correctness, in the sense that the values associated to a label can be overwritten. To better understand this example scheme and this behavior, $\Sigma_M$ is described as supporting read, write, and erase operations instead of get, put, and delete operations. More precisely, these operations work as follows:

write: takes as input a label $\ell$, a tuple v and a sequence of addresses a and stores the pair ($\ell$, v') such that for all 1≤i≤#v, $v_i$ is stored at index $a_i$ of v. In this example #v' ≥#v.

read: takes as input a label $\ell$ and a sequence of addresses a and returns the values in $\ell$ 's tuple v' indexed by a.

erase: takes as input a label $\ell$ and a sequence of addresses a and removes the values indexed by a from $\ell$ 's tuple v.

The example construction is referred to as an addressable multi-map.

According to some embodiments, the system is configured to enable concurrency via two-dimensionality. According to one embodiment, the encrypted multi-map $\mathrm{EMM}_M$ will be used by $\Omega_P$ to store the tuple associated with a label $\ell$. Typical operation results in contention when multiple clients are writing to the same label, and which in turn, results in slowing down $\Omega_P$'s write throughput under parallel put operations. Various embodiments are configured to resolve the contention and the throughput issue. For example, the system can be configured to employ $\mathrm{EMM}_M$ as a 2-dimensional (encrypted) multi-map, instead of using a standard multi-map. In this example, the multi-dimension multi-map is configured to hold label/tuple pairs with labels of the form $\ell = (\ell x, \ell y)$. Given a high contention label $\ell$, $\Omega_p$ is configured to process $\ell$ as a multi-dimensional label $\ell' = (\ell, u)$, where u is a value sampled uniformly at random from {1, . . . , p}, and store the pair (($\ell$, u), v) in $\mathrm{EMM}_M$. Stated broadly, the system manages the scenarios where n clients try to write to the same high-contention label $\ell$ then, in expectation, only n/p writes will be executed on the same two-dimensional label $\ell' = (\ell, u)$ in $\mathrm{EMM}_M$. Further embodiments can be configured with additional optimization via a two-choice allocation instead of just sampling u at random.

Various embodiments enable this operation based on the two-dimensional encrypted multi-map supporting—in addition to read, write and erase operations-read operations on a single dimension. To facilitate understanding, in various embodiments, n write ($\ell$, v) operations for $EMM_M$ can be transformed to n writes of the form (($\ell$, u), v) for 1≤u≤p. In various examples, this architecture does not cause any issue during write operations, but potential issues can result for reads since a hypothetical read needs to return the values associated with every two-dimensional label ($\ell$, u)$_{1 \leq u \leq p}$. An example solution requires the client to compute and send p read tokens to the server; one for each u∈{1, . . . , p}. Other embodiments are configured to support two additional algorithms, ReadXToken and ReadXYToken, to improve operation.

According to one example, the first algorithm, ReadXToken, can be used by the client to generate a read token for the x-component of a label $\ell = (\ell x, \ell y)$. The second algorithm, ReadXYToken, is used by the server to generate a read token for $\ell = (\ell x, \ell y)$ given a read token for $\ell x$ and the y-component $\ell y$. When querying for a label $\ell$, the system (e.g., client) can be configured to send to the server a read token for f and the server can use that to generate read tokens for the two-dimensional labels ($\ell$, 1), . . . , ($\ell$, p).

The following examples and embodiments describe the syntax of addressable two-dimensional multi-map encryption schemes. Various embodiments provide a response-hiding stateless addressable two-dimensional multi-map encryption scheme. The scheme can be a structured encryption scheme $\Sigma_M$=(Init, WriteToken, Write, ReadToken, ReadXToken, ReadXYToken, Read, EraseToken, Erase, Resolve) that can include the preceding polynomial-time algorithms. Examples of the algorithms are shown in the Source Code Appendix, which forms an instant part of this specification. In further embodiments, $\Sigma_M$ provides a practical stateless encryption scheme for addressable two-dimensional multi-maps.

According to one example, the scheme is described in detail in FIG. 1. The various implementations can be understood to work as follows. According to some embodiments, the scheme employs a pseudo-random function F and of a symmetric encryption scheme SKE. Init samples a k-bit key $K_t$ for F, generates a key $K_e$ for SKE and initializes an empty dictionary DX that will represent the encrypted multi-map EMM. The WriteToken algorithm produces a write token wtk that consists of a key $K_\ell := F(F_{K_t}(K_{\ell x}), K_{\ell y})$ and encryptions of each value in v under the key $K_e$. The Write algorithm stores pairs of the form $(t_i, ct_i)$ in the dictionary DX, where $t_i := F_{K_\ell}(a_i)$ and $ct_i$ is the encryption of $v_i$. The ReadToken algorithm is configured to return the key $K_\ell := F(F_{K_t}(K_{\ell x}), K_{\ell y})$ as the read token rtk and Read returns the ciphertexts in DX associated to the labels $F_{K_\ell}(a_i)$, for all $a_i \in a$. The ReadXToken algorithm is configured to return $K_x := F_{K_t}(\ell_x)$ as its read-x token, and ReadXYToken is configured to return $F_{K_x}(\ell_y)$ as the read token. EraseToken is configured to output $K_\ell := F(F_{K_t}(\ell_r))$ as the erase token etk and Erase sets $DX[F_{K_\ell}(a)]$ to ⊥. Resolve recovers v by decrypting the sequence of ciphertexts ct using $K_e$.

FIG. 1 illustrates an example stateless addressable two-dimensional multi-map encryption scheme. According to some embodiments, the scheme is addressable, however, the scheme does not inherently guarantee correctness since tuple values can be overwritten if writes for two different values are made to the same address. Further embodiments can be configured to employ another scheme to encrypt an auxiliary structure that is configured to provide "overwrite protection" for $EMM_M$.

According to one embodiment, $\Sigma_M$ is optimal with respect to communication complexity: write tokens are O(#v), read and erase tokens are O(1) and read responses are O(#a). In further example, the scheme is also optimal with respect to server-side computation since writes and reads are O(#a) and erase operations are O(1). Client-side operations are also optimal since computing write tokens is O(#a), computing read and erase tokens is O(1) and resolving is O(#ct).

Example Two-Dimensional Immutable Dictionaries

In further embodiments, a second building block, $\Sigma_C$, which can be a dictionary encryption scheme that achieves statelessness and correctness. Some examples provide these features at the cost of limited query functionality and (in some cases) a slight decrease in query efficiency. This scheme is configured to satisfy several non-standard properties described in greater detail below.

Example Overwrite Protection

As discussed above, $\Sigma_M$ achieves statelessness by easing on correctness and, specifically, by not guaranteeing that values cannot be overwritten. Various embodiments address this limitation via an auxiliary encrypted structure $EDX_C$ produced with a dictionary encryption scheme $\Sigma_C$ to store information that limits overwrites in $EMM_M$. Embodiments of $\Sigma_C$ have been designed so that they are both stateless and correct, in the sense that it does not allow overwrites.

An example approach that achieves these goals includes an option to associate a counter count $\ell$ with every label in the main encrypted multi-map $EMM_M$, store the pairs ($\ell$, count $\ell$) in a dictionary DX, encrypt DX using a response-revealing dictionary encryption scheme and store the resulting encrypted dictionary $EDX_C$ with the main encrypted multi-map $EMM_M$. To add a label/tuple pair ($\ell$, v) to $EMM_M$, the system (e.g., the client) is configured to send encryptions of v and a $\Sigma_C$ get token $gtk_C$ for $\ell$ so that the server can query $EDX_C$, recover count $\ell$ and store the ciphertexts ct in $EMM_M$ at addresses a=(count $\ell$ +1, . . . , count $\ell$ +#ct). The server then updates the pair ($\ell$, count $\ell$) in $EDX_C$ to ($\ell$, count $\ell$ +#ct).

Example Snapshot Security Via Immutability

Additional embodiments resolve potential security concerns of the above approach. While this approach may seem reasonable, it has a subtle security flaw if implemented naively. The problem is with the last step where the server updates $EDX_C$ with the new counter value. If this is done in-place, then a snapshot adversary will be able to correlate $EDX_C$ put operations—and therefore $EMM_M$ write operations-since every put for a label results in changes at a specific location of EDX. It is realized that even if the location of the pairs in $EDX_C$'s underlying structure are randomized, there may still be a consistent string associated to the pair that could be used to correlate. While some embodiments use randomization, further security improvements can be realized.

For example, various embodiments include $\Sigma_C$ configured in such a way that $\Sigma_C$ supports edits in an immutable manner so that correlations are not revealed. One example approach implements the encrypted dictionary using an encrypted multi-map and implements dictionary edit operations with multi-map append operations. For example, the system is configured to, when changing a pair ($\ell$, v) in the encrypted dictionary to ($\ell$, v') append the new value v' to $\ell$'s tuple in an encrypted multi-map. A dictionary get operation for $\ell$ can then be implemented by returning the last value of $\ell$'s tuple in the underlying multi-map. According to various embodiments, because an $EDX_C$-level edit is implemented as an encrypted multi-map append, a snapshot adversary cannot correlate between edit operations.

Example (Efficient) Immutability Via Completeness

As discussed above, the STE schemes implemented by the system, and as a building block for $\Omega_P$ have been designed to be stateless. The system is configured to maintain the stateless property for the encrypted dictionary $EDX_C$ and its underlying encrypted multi-map. The properties may seem cross purpose, however, various embodiments implement $EDX_C$'s underlying EMM to guarantee that the EMM has a special property which enables a stateless and correct scheme. For example, the underlying multi-map will always be complete, in the sense that for all labels $\ell$, if $\ell$'s tuple v includes m values then there does not exist an index $1 \leq i \leq m$ such that $v_i = \bot$.

According to some embodiments, the above guarantee of completeness enables support of get tail operations on the underlying encrypted multi-map efficiently—where the tail of a label/tuple pair is the last element of the label's tuple. More precisely, in various examples the system provides this functionality using the following variant of binary search. According to one example, consider a sequence $S = (v_1, \ldots, v_n, \bot_{n+1}, \ldots, \bot_N)$. Given S, we would like to find the address a such that $v_a \neq \bot$ but $v_{a+1} = \bot$. This problem can be solved in O(N) time with linear scanning but also in O(log N) time as follows: given S, check if the element at address N/2 is $\bot$; if so recur on the "left half" of S otherwise recur on the "right half" of S. The base case occurs when the set holds a single element. Embodiments of the algorithm are described in detail in FIG. 6.

Example Concurrency Via Two-Dimensionality

According to some embodiments, another characteristic of $\Sigma_C$ is that, like $X_M$, $\Sigma_C$ is two-dimensional in order to provide support for concurrent $\Omega_P$ operations. The following examples and embodiments describe the syntax of addressable two-dimensional multi-map encryption schemes. Various embodiments provide a response-revealing stateless immutable two-dimensional multi-map encryption scheme. The scheme can be a structured encryption scheme $\Sigma_C$=(Init, PutKey, PutToken, Put, GetToken, GetXToken, GetXYToken, Get, DeleteToken, Delete) that can include the preceding polynomial-time algorithms. Examples of the algorithms are shown in Source Code Appendix.

FIG. 2 illustrates an example of the scheme $\Sigma_C$. Evaluations of the approach show that embodiments of $\Sigma_C$ are optimal with respect to communication complexity: all tokens and responses are O(1). All its algorithms are also O(1) with the exception of Put and Get which are O(log $\#MM_C$) and Delete which is O($\#MM_C[\ell]$).

Example Two-Dimensional Append Multi-Maps

As discussed above, $\Omega_P$ encrypts the input multi-map MM with a stateless addressable scheme $\Sigma_M$ to produce a main encrypted multi-map $EMM_M$ and then encrypts a dictionary to avoid overwrites with a stateless (two-dimensional) immutable dictionary encryption scheme $\Sigma_C$. Embodiments that include these features achieve a stateless snapshot-secure semi-dynamic scheme. However further embodiments expand functionality to support deletes. For example, augmenting the scheme to support deletes can be achieved with minor updates if all the system enables is correctness, but further implementation to handle deletes without affecting the scheme's query complexity includes additional considerations. The inventors have realized that the problem stems from deleting label/value pairs from the main encrypted multi-map $EMM_M$. So for example, if the multi-map originally stored a pair ($\ell$, v), where #v=m, and then values ($v_1, \ldots, v_{m-1}$) are deleted, querying the structure for $\ell$ would still be O(m). Some embodiments are configured to address this issue so, $\Omega_P$ includes, in addition to $EMM_M$ and $EMM_C$, an encrypted multi-map $EMM_D$ that stores, for every label in $EMM_M$, the gaps/holes in $\ell$'s tuple v. When the server executes a get for, it first queries $EMM_D$ to retrieve $\ell$'s gaps gf and uses that to only read from the existing locations in $\ell$'s tuple.

In further embodiments, other characteristics of $\Sigma_D$ include (like $\Sigma_C$) two-dimensionality in order to provide support for concurrent $\Omega_P$ operations. $\Sigma_D$ can also support two kinds of insert operations, append and put which work as described on Source Code Appendix.

Various embodiments enable $\Sigma_D$ to support multiple kinds of inserts to allow $\Omega_P$ to make different kinds of insertions at different times. For example, $\Omega_P$ can be configured to append gaps to $\ell$'s tuple in $EMM_D$ when deletes on $\ell$ are made; and $\Omega_P$ can be configured to put entire label/tuple pairs in $EMM_D$ during compaction (discussed in greater detail below).

The following examples and embodiments describe the syntax of a response-revealing stateless two-dimensional multi-map encryption scheme. The scheme can be a structured encryption scheme $\Sigma_D$=(Init, AppendKey, AppendToken, Append, PutKey, PutToken, Put, GetToken, GetXToken, GetXYToken, Get, DeleteToken, Delete) that can include the preceding polynomial-time algorithms. Examples of the algorithms are shown in Source Code Appendix.

According to some embodiments, the design of $\Sigma_D$ is shown with detailed examples in FIGS. 3 and 4. Further embodiments show that $\Sigma_D$ is optimal with communication complexity: where all tokens are O(1) and responses are O($MM_D[\ell]$). The algorithms reference above are also optimal with the exception of Append which is O(log $\#MM_D$).

Example Enumerable Sets

As discussed above, $\Omega_P$ encrypts the input multi-map with a stateless addressable multi-map encryption scheme $\Sigma_M$ which results in a main encrypted multi-map $EMM_M$. Overwrite protection can be achieved by encrypting a dictionary that stores counters with a stateless two-dimensional dictionary encryption scheme $\Sigma_C$ which results in an auxiliary structure $EDX_C$. Information about deletions is stored in encrypted multi-map $EMM_D$ using a two-dimensional scheme $\Sigma_D$. This information can be used to speed up query operations. The embodiments and examples described achieve statelessness and correctness but can still be optimized further as they are not necessarily space efficient. On review, the space complexity of the three structures described is $O(\Sigma_\ell \#MM[\Sigma_\ell]+\#puts+\#deletes)$, where $\Sigma_\ell \#MM[\ell]$ is the size of the input multi-map and #puts and #deletes are the total number of put and erase operations made on the input multi-map. Note the analysis depends on the total number of puts and deletes ever made and not on the size of the input multi-map. To address these considerations, various embodiments of $\Omega_P$ use a process called compaction to remove stale data from $EMM_C$ and $EMM_D$.

According to one embodiment, the compaction process can be executed by the server which means it needs access to information stored in both $EMM_C$ and $EMM_D$. More precisely, the server utilizes the ability to query these structures to delete certain pairs and to add new ones. To enable this operation, the client generates get, put and delete tokens for $EMM_C$ and $EMM_D$ whenever the client executes a put or erase for $\Omega_p$. According to one example, these tokens are stored in an auxiliary encrypted set structure $EST_P$ and used at compaction time. According to some embodiments, the encrypted set structure supports the following operations:

insert: takes as input an element and stores it in the set;
enum: enumerates all the elements in the set.

The following examples and embodiments describe the syntax of a response-revealing stateless set encryption scheme. The scheme can be a structured encryption scheme $\Sigma_P$=(Init, InsertToken, Insert, Enum) that can include the preceding polynomial-time algorithms. Examples of the algorithms are shown in Source Code Appendix.

Example implementation of the scheme $\Sigma_P$ is described in FIG. 5. According to one example, the scheme includes an encrypted set EST that includes symmetrically-encrypted elements, an insert token that includes the encryption of the inserted element and an enumeration that includes decryption of the ciphertexts in the encrypted set and listing the plaintexts.

Example Stateless Multi-Map Encryption Scheme

Considerations for the high level structure of $\Omega_P$ have been described above in the previous sub-sections to facilitate understanding and describe the design of example building blocks of the scheme. As discussed, embodiments of the scheme make use of an addressable multi-map encryption scheme EX, an immutable two-dimensional dictionary encryption scheme $\Sigma_C$, a two-dimensional append multi-map encryption scheme and an enumerable set encryption scheme $\Sigma_P$. According to one embodiment $\Omega_p$ includes functions Init, PutToken, Put, GetToken, Get, DeleteToken, CompactionToken, Compaction, EraseToken, Erase, Resolve, which are described in FIGS. 8, 9, and 10.

Example Implementation: Put Operations

According to some embodiments, PutToken for a label $\ell$ and tuple v first determines if $\ell$ is a high contention label. If so, the function creates a two-dimensional label $\ell'=(\ell, u)$, where $u \to \$\{1, \ldots, p\}$. If not, the function creates a two-dimensional label $\ell'=(\ell, 0)$, and then creates a put token ptk which consists of: (1) an $EMM_M$ write token $wtk_M$ for $(\ell', v)$; (2) an $EDX_C$ get token $gtk_C$ for $\ell'$; (3) an $EDX_C$ put key for $\ell'$; (4) an $EST_P$ insert token $itk_P$; and (5) the size of v. The $EST_P$ insert token $itk_P$ is for an element that is the concatenation of $EDX_C$ get and delete tokens for $\ell'$, a put key for $\ell'$ and $EMM_D$ get and delete tokens for $\ell'$. According to one embodiment, these elements are stored in $EST_P$ and also used later during compaction.

Given a put token ptk=($wtk_M$, $gtk_C$, $pk_C$, $itk_P$, m), the Put algorithm uses $gtk_C$ to retrieve a counter count from $EDX_C$ that represents the number of previously used addresses in the tuple of $\ell'$. For example, the server uses this counter, together with the write token wtk, to write to $EMM_M$ without overwriting. Specifically, the server executes $\Sigma_M$. Write with $wtk_M$ and addresses $a=(count_\ell, \ldots, count_\ell +m-1)$. The server can be configured to update the counter of $EDX_C$ by generating a put token ptk with the put key $pk_C$ and value count+m and applying $ptk_C$ to $EDX_C$. The server can be configured to update the encrypted set $EST_P$ with $itk_P$.

Example Implementation: Get Operations

According to one embodiment, GetToken produces a get token gtk for a label $\ell$ that consists of: (1) a read x-token $rxtk_M$ for $\ell$; (2) a get-x token $gxtk_C$ for $\ell$; (3) a get-x token $gxtk_D$ for E and (4) a flag that describes whether the label is a high contention label or not. Given a get token gtk=($rxtk_M$, $gxtk_C$, $gxtk_D$, cont), the Get algorithm first uses the flag to determine if the label is a high contention label. If so, the server uses gxtk with values $\{1, \ldots, p\}$ to generate p get tokens $(gtk_{C,1}, \ldots, gtk_{C,p})$, where $gtk_{C,i}$ is for the two-dimensional label $(\ell, i)$. The server then queries $EDX_C$ with these tokens to retrieve p counters $(count_1, \ldots, count_p)$ from $EDX_C$ for the two-dimensional labels $(count_i, \ldots, count_p)$. Similarly, for all $1 \leq i \leq p$, if $count_i > 0$, the server uses $gxtk_D$ with $\{i\}$ to generate a get token $gtk_{D,i}$ and uses it to recover the gaps $g_i$ for the two-dimensional label $(\ell, i)$. In addition, the server uses rxtkM to generate a read token rtkM,i for the two-dimensional label $(\ell, i)$. According to some examples, the server then uses the counters and gaps to generate the sequence of used addresses it needs to read from $EMM_M$. If the label is not a high contention label, the server can execute the above with a single two-dimensional label $(\ell, 0)$.

Example Implementation: Erase Operations

According to one embodiment, EraseToken produces an erase token etk for a two-dimensional label $(\ell, u)$ and address a that consists of: (1) an erase token $etk_M$ for $(\ell \| u)$; (2) a get token $gtk_D$ for $(\ell, u)$; (3) an append token $atk_D$ for $(\ell, u)$; (4) the address a to erase; and (5) an insert token $itk_P$ for a set of compaction-time tokens, i.e., a set of $EDX_C$ and $EMM_D$ tokens configured for use during compaction. According to one example, the Erase algorithm uses $itk_P$ to insert the compaction tokens in the encrypted set $EST_P$ and uses $etk_m$ to erase the element at address a from $(\ell, u)$'s tuple in $EMM_M$.

Example Implementation: Compaction

According to one embodiment, CompactionToken outputs the key $K_P$ as a compaction token. At a high level, for every in $EMM_M$, the compaction algorithm first retrieves $\ell$'s counter from $EDX_C$ and $\ell$'s gaps from $EMM_D$. Once collected, the algorithm is configured to then delete everything related to from both $EDX_C$ and $EMM_D$ which includes "stale" data, for example, old counter values in $EDX_D$. The deletion enables reclamation of wasted space. Once removed, the algorithm then re-inserts $\ell$'s counter in $EDX_C$, merges $\ell$'s gaps and re-inserts them in $EMM_D$. Merging in this context includes operations where $\ell$'s gaps are re-encoded into a more compact representation. For example, if $\ell$'s gaps include four holes i, i+1, i+2, i+3 then the algorithm encoded them as a single gap [i, 3]. A detailed description of an example merge process is given in FIG. 7.

According to further embodiments, the compaction algorithm enumerates $EST_P$ which returns a set P of elements of the form $gtk_C \| dtk_C \| pk_C \| gtk_D \| dtk_D$. For example, these elements encode a set of tokens needed to compact $EDX_C$ and $EMM_D$ for some label. For each of the elements in P, the algorithm is configured to use $gtk_C$ to retrieve $\ell$'s counter from $EDX_C$ and $gtk_D$ to retrieve gaps g from $EMM_D$. The algorithm then merges g into a new sequence g. $\ell$ is then deleted from $EDX_C$ and $EMM_D$ using $dtk_C$ and $dtk_D$, respectively. If g'={1, ..., count} then every element of $\ell$'s tuple has been erased and nothing else needs to be done. If g'≠{1, ..., count}, however, the algorithm is further configured to: (1) use $pk_e$ to generate a put token for $\ell$'s counter and inserts the counter into $EDX_C$; and (2) use $pk_D$ to generate a put token for g and inserts the token into $EMM_D$.

According to some embodiments, during compaction, if the data related to a particular label $\ell$ is being compacted then get, put and delete operations can still occur simultaneously on any label $\ell' \neq \ell$. According to one embodiment, the Resolve algorithm executes Σ's resolve algorithm and returns its output.

Example Implementation: Stateless Range Multi-Map Encryption Scheme

According to some embodiments, the system can include a range multi-map encryption scheme $\Omega_R$=(Init, PutToken, Put, RangeToken, Range, EraseToken, Erase, CompactionToken, Compaction, Resolve), for example, that is used by OST1. Various embodiments have been adapted from an ERX framework described in "Encrypted Range Search via Range Hypergraph", by Kasemsan Kongsala, Seny Kamara, and Tarik Moataz. Example implementation makes use of a multi-map encryption scheme Σ and a range hypergraph H equipped with efficient algorithms EdgesH and MincoverH. According to some examples, the scheme is updated to instantiate Σ with the stateless multi-map encryption scheme $\Omega_P$ and H with a new hypergraph referred to as a sparse partition hypergraph. Example details of the construction are provided in FIG. 11 and the sparse partition hypergraph is described in the Source Code Appendix. According to some embodiments the scheme includes the functions described in the Source Code Appendix.

Example Implementation: Storage-Level Emulation of OST1

A common belief in this space is that STE may be limited based on use of non-standard data structures and query algorithms which can limit applicability since STE requires re-architecting existing database systems. Various embodiments described herein resolve the legacy-friendly concern of STE. For example, one reason traditional STE schemes are believed to be not legacy-friendly is because they make two implicit assumptions about the server: (1) that it can store arbitrary data structures; and (2) that it can execute arbitrary algorithms. A legacy-friendly scheme does not make these assumptions and is designed to work with servers that can only store a fixed kind of data structure and execute a fixed set of operations. For example, a SQL-friendly STE scheme is a scheme that produces encrypted structures that can be stored as relational databases and that has query and update algorithms that can be executed as standard SQL operations. Similarly, a MongoDB-friendly STE scheme is a scheme that produces encrypted structures that can be stored as document databases and that have query and update algorithms that can be executed using standard MongoDB operations.

Emulation Examples

Stated broadly, various aspects provide emulation that is configured to take an encrypted data structure (e.g., an encrypted multi-map) and find a way to represent it as another data structure (e.g., a graph) without any additional storage or query overhead. Intuitively, emulation is a more sophisticated version of the classic data structure problem of simulating a stack with two queues. Designing storage- and query-efficient emulators can be challenging depending on the encrypted structure being emulated and the target structure (i.e., the structure used to emulate on top of). According to various embodiments, the benefits of emulation are twofold: (1) a low-overhead emulator essentially makes an STE scheme legacy-friendly; and (2) emulation preserves the STE scheme's security.

Example Implementation: Storage-Level Emulation of OST1

The following examples and embodiment describe a storage-level emulation rather than a fully-emulated version of OST1. The difference between full and storage-level emulation is that the latter emulates the data structures of the scheme but not its query and update algorithms. In other words, various embodiments of the emulated OST1 scheme require no modifications to the server's storage system but implement new query algorithms. Other embodiments provide for fully emulating OST1 (no query algorithm changes) but the following examples of the storage-level emulation results in a more communication-efficient scheme. Example implementation details for storage-level emulation of OST1 is described in FIGS. 12 through 26 and include the following (encrypted) operations: collection creation, document insertion, document update, exact search, negation, range search, conjunctive search, disjunctive search, Boolean search, document deletion and compaction. Some of these operations make use of subroutines which are detailed in FIGS. 28, 34, and 35. The following provides further illustrative description of examples of such operations below. According to some embodiments, a document can define a base unit of data, that for examples, stores data as attribute value pairs (e.g., as fields with, for example, field names), may include other documents, and/or other complex structures (e.g., arrays). A collection can be a logical grouping of documents, and may be accessed by a name associated with the grouping.

Example notation used: The set of all encrypted fields in the database is F, the set of encrypted fields that support exact queries is EF⊆F, the set of encrypted fields that support range queries is RF⊆F and the set of encrypted fields that are high contention as HC⊆F. Given some document D, denote by EFD, RFD and HCD the fields in D that support equality and range queries and that are high contention, respectively. Reference to a field f, f refers to the "absolute" path of the field, i.e., db.collection.f if the field f is not nested, or db.collection. field.f if it is nested. Various examples use this approach to guarantee that every field in the database is unique. To facilitate understanding, recall that when F is a pseudo-random function, it is sometimes written as $FS[s_1, s_2, \ldots, s_n]$ to mean F (F (F (F (S, $s_1$), $s_2$), ... ), $s_n$).

Example Database Implementation and Schema Examples

According to some embodiments, the following description assumes that server stores a schema that includes the following information for encrypted fields:
query type: whether the field supports exact or range queries;
numerical type: ⊥ for fields that support exact queries and a tuple of the form (precision, lBound, uBound, sparsity) for fields that support range queries;
contention level: an integer p≥1 that determines the field's level of contention. p=0 Indicates the field has no contention.

Example scrub function. Various embodiments can optionally use a function "scrub" which takes in as input a query Q (e.g., a MongoDB Query Language ("MQL") query) and outputs a clean query Q which is like Q with the exception that its values are replaced with an "obfuscation" symbol ■. Other embodiments can be implemented with other native databases and their respective query languages.

Example MQL Operations

Create collection. Described are operations on how to create a collection. There are many ways to create a collection each one supporting a different key generation mode. Example pseudo-code for these modes is given in FIG. 12 and can include the follow functions/modes:
driver-generated keys: in this mode, the data encryption keys are generated by OST1. Detailed examples are shown in the createCollectionDriverKeys operation of FIG. 12.
user-generated collection-level key: in this mode, the user provides a collection-level key from which OST1 derives the necessary data encryption keys. Detailed examples are shown in the createCollectionCollectionKeys of FIG. 12.
user-generated document-level keys: in this mode, the user provides a key for every document from which OST1 derives the necessary data encryption keys. Detailed examples are shown in the createCollectionDocumentKeys of FIG. 12.
user-generated field-level keys: in this mode, the user provides a key for every field in the collection which OST1 uses as the data encryption key. Note that for some field f, the same data encryption key is used across all documents in the collection. Detailed examples are shown in the createCollectionFieldKeys of FIG. 12.
user-generated field- and document-level keys: in this mode, the user provides a key for every field of every document which OST1 uses as the data encryption key. Note that for some field f, different data encryption keys are used across the documents in the collection. Detailed examples are shown in the createCollectionFieldDocumentKeys of FIG. 12.

Example Insert Operation. An example insert operation is shown in FIG. 13. The pseudo-code describes how to insert documents without nested documents or arrays. Additional functions and operations are described in Source Code the Source Code Appendix.

FIG. 37 is a block diagram of an example computer system that is improved by implementing the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 3700 that may be used in connection with any of the embodiments of the disclosure provided herein is shown in FIG. 37. The computer system 3700 may include one or more processors 3710 and one or more articles of manufacture that comprise non-transitory computer-readable storage media (e.g., memory 3720 and one or more non-volatile storage media 3730). The processor 3710 may control writing data to and reading data from the memory 3720 and the non-volatile storage device 3730 in any suitable manner. To perform any of the functionality described herein (e.g., image reconstruction, anomaly detection, etc.), the processor 3710 may execute one or more processor-executable instructions stored in one or more non-transitory computer-readable storage media (e.g., the memory 3720), which may serve as non-transitory computer-readable storage media storing processor-executable instructions for execution by the processor 3710.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various one of the functions and/or portions of the flow can be omitted, or consolidated. In yet other embodiments, various one of the functions and/or portions of the flow can be combined, and used in various combinations of the disclosed flows, portions of flows, and/or individual functions. In various examples, various one of the screens, functions and/or algorithms can be combined, and can be used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A database system comprising:
at least one processor operatively connected to a memory, the at least one processor when executing configured to:
enable end-to-end encryption of plaintext data via an emulation of a database implementation;
accept and process queries against the emulation of the database implementation, such that the queries operate on and retrieve encrypted data from the emulation;
instantiate the emulation of the database implementation, the emulation including:
at least a first encrypted data structure configured to:
store encrypted representations of the plaintext data;
link multi-dimension labels to respective encrypted representations in the first encrypted data structure;
receive and execute database operations against the encrypted representations using the multi-dimension labels; and
at least a second encrypted data structure configured to:
store encrypted metadata associated with the first encrypted data structure; and
prevent overwrite conditions from occurring on the first encrypted data structure using the encrypted metadata.

2. The system of claim 1, wherein the at least one processor is further configured to receive and execute concurrent database operations against the first encrypted data structure.

3. The system of claim 1, wherein the at least one processor is further configured to receive and execute concurrent database operations against the second encrypted data structure.

4. The system of claim 1, wherein the at least one processor is further configured to receive and execute stateless database operations against the first encrypted data structure.

5. The system of claim 1, wherein the at least one processor is further configured to receive and execute stateless database operations against the second encrypted data structure.

6. The system of claim 1, wherein the emulation further comprises a third encrypted data structure configured to store gap information for the multi-dimension labels and respective encrypted representations.

7. The system of claim 6, wherein the third encrypted data structure is configured to limit reads executed on the first encrypted data structure to occur on locations in the first encrypted data structure having existing data.

8. The system of claim 6, wherein the at least one processor is further configured to receive and execute concurrent and/or stateless database operations against the third encrypted data structure.

9. The system of claim 6, wherein the emulation further comprises an encrypted set structure configured to:
store operation tokens generated for database operations on the second and third encrypted data structures; and
enable compaction of the second and/or third encrypted data structures.

10. A computer implemented method for database encryption, the method comprising:
accepting and processing queries, by the at least one processor, against an emulation of a database implementation, such that the queries operate on and retrieve encrypted data from the emulation;
instantiating, by the at least one processor, the emulation of the database implementation, the emulation including at least a first encrypted data structure;
storing, by the at least one processor, encrypted representations of the plaintext data in the first encrypted data structure;
linking, by the at least one processor, multi-dimension labels to respective encrypted representations in the first encrypted data structure;
receiving and executing, by the at least one processor, database operations against the encrypted representations using the multi-dimension labels;
instantiating, by the at least one processor, at least a second encrypted data structure;
storing, by the at least one processor, encrypted metadata associated with the first encrypted data structure; and
preventing, by the at least one processor, overwrite conditions from occurring on the first encrypted data structure using the encrypted metadata.

11. The method of claim 10, wherein the method comprises receiving and executing concurrent database operations against the first encrypted data structure.

12. The method of claim 10, wherein the method comprises receiving and executing concurrent database operations against the second encrypted data structure.

13. The method of claim 10, wherein the method comprises receiving and executing stateless database operations against the first encrypted data structure.

14. The method of claim 10, wherein the method comprises receiving and executing stateless database operations against the second encrypted data structure.

15. The method of claim 10, wherein the method comprises generating a third encrypted data structure configured to store gap information for the multi-dimension labels and respective encrypted representations.

16. The method of claim 15, wherein the method comprises limiting reads executed on the reads executed on the first encrypted data structure to occur on locations in the first encrypted data structure having existing data, based at least in part on data stored in the third encrypted data structure.

17. The method of claim 15, wherein the method comprises receiving and executing concurrent and/or stateless database operations against the third encrypted data structure.

18. The method of claim 15, wherein the method comprises:
storing operation tokens generated for database operations on the second and third encrypted data structures in an encrypted set structure; and
enabling compaction of the second and/or third encrypted data structures based at least in part on the encrypted set structure.

19. A non-transitory computer readable medium containing instructions that when executed cause at least one processor to perform a method for for database encryption, the method comprising:
accepting and processing queries against an emulation of a database implementation, such that the queries operate on and retrieve encrypted data from the emulation;
instantiating the emulation of the database implementation, the emulation including at least a first encrypted data structure;
storing encrypted representations of the plaintext data in the first encrypted data structure;
linking multi-dimension labels to respective encrypted representations in the first encrypted data structure;
receiving and executing database operations against the encrypted representations using the multi-dimension labels;
instantiating at least a second encrypted data structure;
storing encrypted metadata associated with the first encrypted data structure; and
preventing overwrite conditions from occurring on the first encrypted data structure using the encrypted metadata.

20. The non-transitory computer readable medium of claim 19, wherein the method further comprises receiving and executing concurrent database operations against the first encrypted data structure.

* * * * *